(12) United States Patent
Ablabutyan et al.

(10) Patent No.: US 10,875,482 B2
(45) Date of Patent: Dec. 29, 2020

(54) MOUNTING SYSTEM FOR VEHICLE UNDERRIDE

(71) Applicant: MAXON INDUSTRIES, INC., Santa Fe Springs, CA (US)

(72) Inventors: Karapet Ablabutyan, Glendale, CA (US); Akop Gasparian, Panorama City, CA (US)

(73) Assignee: MAXON INDUSTRIES, INC., Santa Fe Springs, CA (US)

( * ) Notice: Subject to any disclaimer, the term of this patent is extended or adjusted under 35 U.S.C. 154(b) by 3 days.

(21) Appl. No.: 16/247,349

(22) Filed: Jan. 14, 2019

(65) Prior Publication Data

US 2019/0143924 A1 May 16, 2019

Related U.S. Application Data

(63) Continuation-in-part of application No. 15/102,435, filed as application No. PCT/US2014/068890 on Dec. 5, 2014, now Pat. No. 10,220,759.

(60) Provisional application No. 61/914,296, filed on Dec. 10, 2013.

(51) Int. Cl.
  *B60R 19/56* (2006.01)
  *B60P 1/44* (2006.01)

(52) U.S. Cl.
  CPC ............ *B60R 19/56* (2013.01); *B60P 1/4485* (2013.01)

(58) Field of Classification Search
  CPC ......... B60R 19/56; B60R 19/38; B60R 19/14; B60R 2019/268; B60P 1/022; B60P 1/4485; B60P 1/445; B60P 1/431; B60P 1/4471; G01S 13/931; G01S 17/931; B65G 69/001; B65G 69/003

USPC .................................. 414/556, 558; 293/118
  See application file for complete search history.

(56) References Cited

U.S. PATENT DOCUMENTS

| | | |
|---|---|---|
| 3,528,574 A | 9/1970 | Denner et al. |
| 3,737,055 A | 6/1973 | Pettit |
| 4,991,890 A | 2/1991 | Paulson |
| 5,108,140 A | 4/1992 | Bartholet |
| 6,604,765 B1 | 8/2003 | Eull |
| 7,104,166 B1 | 9/2006 | Wong |
| 7,762,756 B1 | 7/2010 | Ablabutyan et al. |

(Continued)

FOREIGN PATENT DOCUMENTS

| | | |
|---|---|---|
| EP | 0903261 A2 | 3/1999 |
| EP | 0941896 A1 | 9/1999 |

(Continued)

OTHER PUBLICATIONS

International Search Report for PCT/US2014/068890 dated Feb. 26, 2015.

*Primary Examiner* — Glenn F Myers
(74) *Attorney, Agent, or Firm* — Concept IP LLP; Michael Zarrabian

(57) ABSTRACT

A mounting mechanism for mounting an underride system on a structure, comprises a pair of clamping jaws, and a first bracket including a first edge for coupling the underride system thereto. The first bracket further includes a second edge for coupling the pair of clamping jaws thereto. Wherein, the first bracket and the pair of clamping jaws define a jaw opening therebetween configured to receive at least a portion of the structure for removably mounting the underride system on the structure using the mounting mechanism.

20 Claims, 36 Drawing Sheets

(56) References Cited

U.S. PATENT DOCUMENTS

| | | | |
|---|---|---|---|
| 2006/0103727 A1* | 5/2006 | Tseng | B60R 1/00 |
| | | | 348/148 |
| 2007/0296600 A1* | 12/2007 | Dixon | A61G 7/05 |
| | | | 340/573.1 |
| 2008/0098861 A1 | 5/2008 | Engvall et al. | |
| 2009/0226290 A1 | 9/2009 | Krause | |
| 2012/0012405 A1* | 1/2012 | Menon | G01G 19/4142 |
| | | | 177/136 |
| 2016/0046230 A1* | 2/2016 | Choi | B60Q 1/30 |
| | | | 340/435 |
| 2018/0001837 A1* | 1/2018 | Trebouet | B60R 19/48 |
| 2019/0235519 A1* | 8/2019 | Carter | G01S 13/931 |

FOREIGN PATENT DOCUMENTS

| | | |
|---|---|---|
| EP | 1188613 A1 | 3/2002 |
| GB | 2137684 A | 10/1984 |

* cited by examiner

DETAIL C

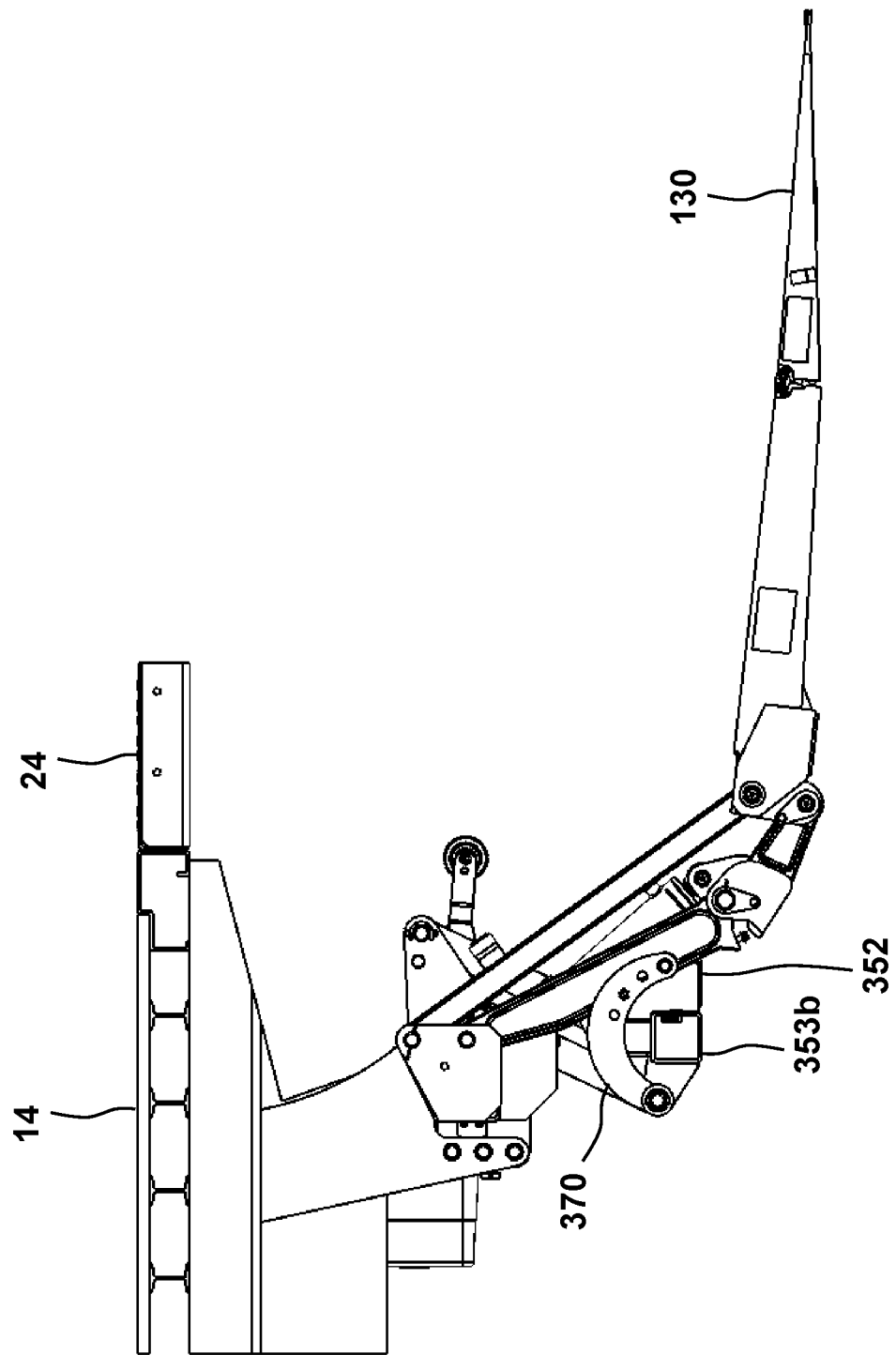

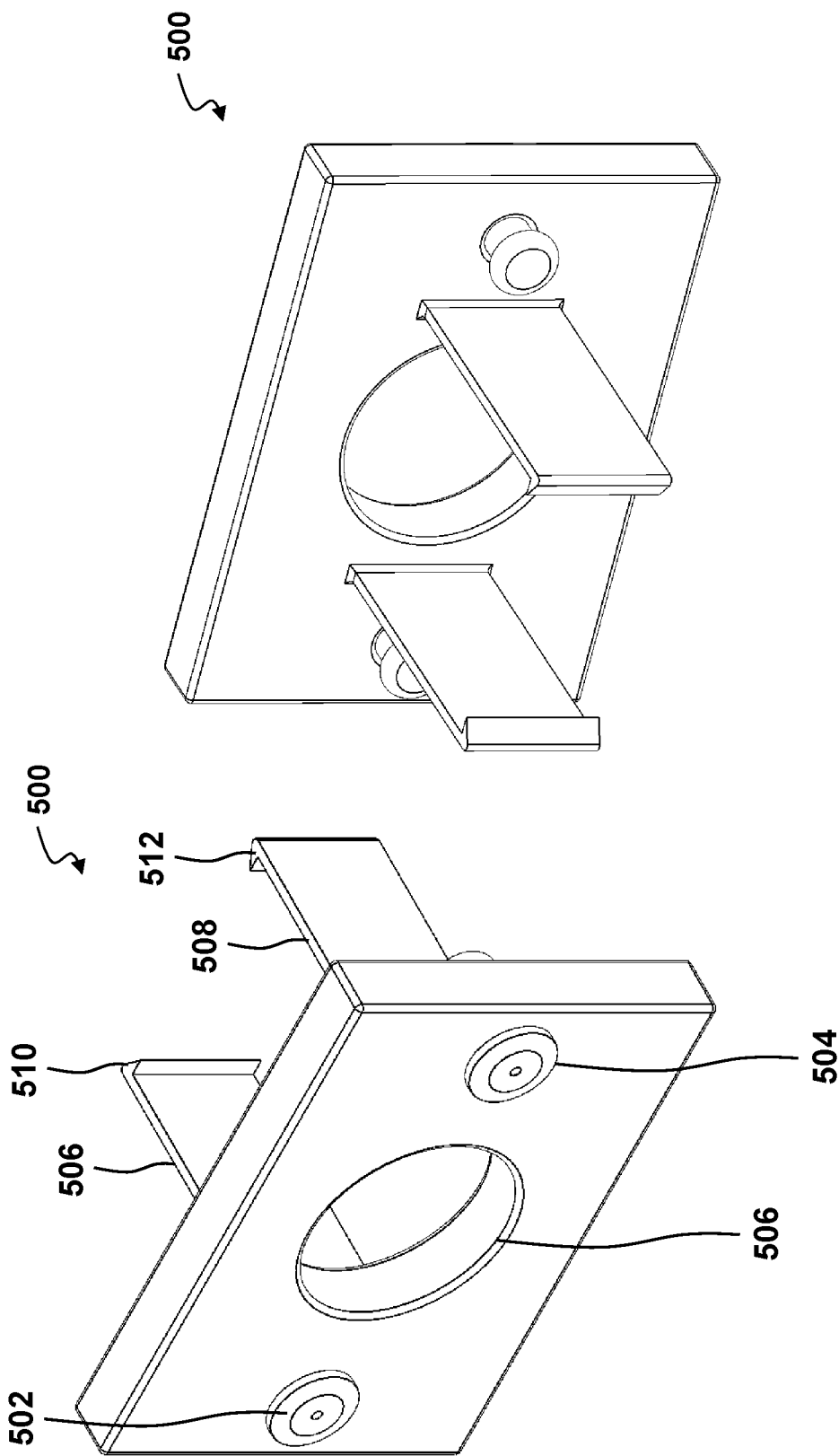

MOUNTING SYSTEM FOR VEHICLE UNDERRIDE

CROSS-REFERENCE TO RELATED APPLICATION

This application is a continuation-in-part of U.S. Nonprovisional patent application Ser. No. 15/102,435, filed Jun. 7, 2016, which is a 35 U.S.C. § 371 National Stage Entry of International Application No. PCT/US2014/068890, filed Dec. 5, 2014, which claims priority benefit of U.S. Provisional Patent Application Ser. No. 61/914,296, filed Dec. 10, 2013, all of which are incorporated herein by reference.

FIELD OF THE INVENTION

The embodiments disclosed herein relate generally to underride systems, and in particular to underride systems for vehicles with lift gates.

DESCRIPTION OF RELATED ART

Rear impact guards, or commonly known as underrides, are used to reduce the chance of following vehicles from driving underneath the bed of a vehicle such as a truck or a trailer. Conventionally, trucks have a fixed horizontal underride installed below the vehicle bed via vertical beams. The fixed underride is positioned under the end of the vehicle close to or flush with a plane of the rear end of the vehicle. The vertical height between the underride and the ground level is at a predefined distance suitable to reduce the chance of following vehicles from traveling underneath the bed of a vehicle. The distance from an edge of the underride to the side end of the vehicle is also at a predefined range. Such fixed underrides are also often used with dock locks (truck locks) to prevent the vehicle from being pushed away or "seesawing" while the vehicle is parked at a dock or other loading facility. A dock lock may include a bar, hook, and/or platform, which engages, holds, latches, and/or supports the fixed underride.

A typical dock lock is designed to operate with such fixed underrides, wherein the dock lock is fixedly positioned by a plate within a short grabbing distance from the dock. During loading and unloading operations, the truck is backed up to the dock against bumpers, wherein the vehicle bed is generally horizontally aligned with the upper surface of the dock. A dock lock hook engages or grabs a center portion of the underride, thus locking the vehicle in position relative to the dock.

Further, lifts such as lift gates are typically mounted at a structure such as the rear of a truck to lift payloads on a platform from one level (e.g., ground level) up to another level (e.g., the bed of the vehicle), or vice versa. A common type of lift, known as a stow lift (tuck under lift), includes a platform that is tucked (stowed) under the vehicle bed when not in use, and can be untucked (unstowed) when needed. In this type of lift, the platform is typically foldable and is linked to an actuator which can raise and lower the platform, as well as stow and unstow the platform. A conventional underride is fixed to the truck so that the underride cannot move. As a result, a conventional fixed underride is not compatible with a lift that is stowed under the rear end of the vehicle since the underride interferes with the stowing and unstowing of the lift.

BRIEF SUMMARY OF THE INVENTION

In one embodiment, a mounting mechanism for mounting an underride system on a structure, comprises a pair of clamping jaws, and a first bracket including a first edge for coupling the underride system thereto. The first bracket further includes a second edge for coupling the pair of clamping jaws thereto. Wherein, the first bracket and the pair of clamping jaws define a jaw opening therebetween configured to receive at least a portion of the structure for removably mounting the underride system on the structure using the mounting mechanism.

In one embodiment, each of the clamping jaws is rotatably attached to the first bracket to allow adjusting the jaw opening for receiving at least a portion of the structure. Each clamping jaw includes an attachment portion for attaching the clamping jaw to the first bracket. Each clamping jaw further includes a tip portion. The mounting mechanism further includes an adjustable fastening mechanism for urging the tip portions of the clamping jaws toward one another when the mounting mechanism is mounted on said structure.

In one embodiment, the mounting system further includes a clearance reduction system configured for reducing clearance between at least the first bracket and the structure when the mounting mechanism is mounted on said structure.

In one embodiment, the underride system is moveable and can be rotatably attached to the first bracket.

In one embodiment, the mounting mechanism further comprises a second bracket, coupled in parallel with the first bracket, wherein the first bracket is spaced relative to the second bracket, and each clamping jaw is coupled to the first bracket and the second bracket such that a portion of each clamping jaw is maintained in said space between the first bracket and second bracket.

In one embodiment, the second bracket includes: a first edge for coupling the underride system thereto, and a second edge for coupling the pair of clamping jaws thereto, wherein the brackets and the pair of clamping jaws define a jaw opening therebetween configured to receive at least a portion of the structure for removably mounting the underride system on the structure using the mounting mechanism.

In one embodiment, each of the clamping jaws is rotatably attached to the brackets to allow adjusting the jaw opening for receiving at least a portion of the structure.

In one embodiment, each clamping jaw includes an attachment portion for attaching the clamping jaw to the brackets.

In one embodiment, each clamping jaw further includes a tip portion, and the mounting mechanism further includes an adjustable fastening mechanism for urging the tip portions of the clamping jaws toward one another when the mounting mechanism is mounted on said structure.

In one embodiment, the underride system comprises an underride member, and a linkage mechanism for rotatably coupling the underride member to the first bracket, wherein the linkage mechanism moves the underride member between an extended position and a retracted position.

In one embodiment, in the extended position the underride member is at a first distance from the structure, and in the retracted position the underride is at a second distance from the structure, such that the first distance is larger than the second distance. In one embodiment, in the extended position the underride member is at a first distance from the structure, and in the retracted position the underride is at a second distance from the structure, such that the first distance is larger than the second distance.

In another embodiment, a lift gate system comprises a lift platform mounted to a vehicle frame via a lift linkage mechanism, and an underride system coupled to the vehicle frame via at least one mounting mechanism. The mounting mechanism comprises a pair of clamping jaws, and a first bracket including a first edge for coupling the underride system thereto. The first bracket further including a second edge for coupling the pair of clamping jaws thereto. Wherein the first bracket and the pair of clamping jaws define a jaw opening therebetween configured to receive at least a portion of the frame for removably mounting the underride system on the frame using the mounting mechanism. The underride system is moveable and is rotatably attached to the first bracket.

These and other features, aspects and advantages of the present invention will become understood with reference to the following description, appended claims and accompanying figures.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 25B shows a side view of the lift gate system of FIG. 25A with the lift platform lowered, according to an embodiment.

FIGS. 28A-28E depict front perspective, rear perspective, rear, front, and side views, respectively, of a sensor bracket with rivets, according to an embodiment.

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Figure 1:
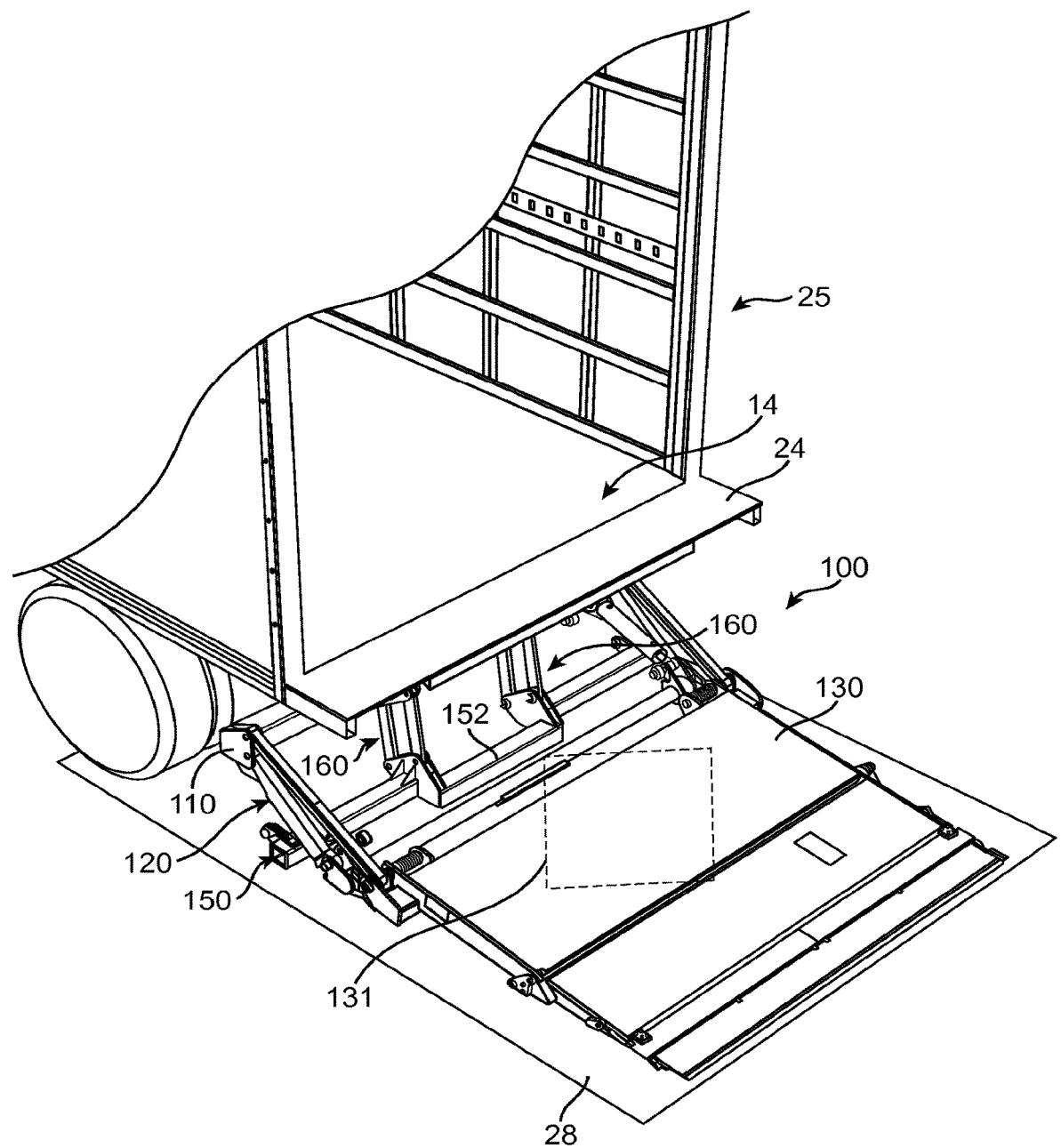
FIG. 1 shows a perspective view of an embodiment of a lift gate system including a moveable underride system mounted on a structure using a mounting system comprising one or more removable mounting mechanisms, according to one embodiment.

Embodiments disclosed herein provide a moveable underride system and a mounting system for removably and adjustably mounting the underride system on a structure such as support frame of a vehicle or a lift gate frame. Such moveable underride system may be used with lifts such as stow lifts (tuck under lifts), in one example application. Referring to FIG. 1, according to an embodiment a lift gate system 100 includes a lift having a lift platform 130 coupled to a support frame 110 of a vehicle via a lift linkage mechanism 120. The lift gate system 100 further includes an underride system comprising a moveable underride 150 coupled to a mounting system for the frame 110 via a linkage mechanism 160. The platform 130 is foldable, and is rotatably coupled to the platform linkages 120 for stowing.

A system embodiment may include: a lift platform for mounting to a structure via a lift linkage mechanism; an underride coupled to the lift linkage mechanism via one or more linkage brackets, where each linkage bracket is rotatably coupled to the lift linkage mechanism, and where a distance of the underride relative to the structure is adjustable via each linkage bracket; one or more apertures disposed in the underride; and one or more sensors disposed in the underride proximate the one or more apertures; where the one or more sensors remain substantially parallel to a vertical plane at any adjusted distance of the underride relative to the structure. The sensor may be a proximity sensor and/or a camera. The linkage bracket may be a substantially straight bracket and/or an arcuate bracket. Each linkage bracket may have one or more holes disposed along a length of the linkage bracket. The disclosed system may also have one or more pins, where each linkage bracket may be rotatably coupled to the lift linkage mechanism via a respective pin of the one or more pins inserted through a hole of the one or more holes disposed along the length of the linkage bracket, and where a distance of the underride relative to the structure may be adjustable based on the hole the respective pin is inserted through.

In one embodiment, the one or more sensors may remain substantially parallel to a vertical plane during movement of at least one of: the lift platform and the underride. The underride may include: a middle portion; a first side portion; and a second side portion; where the middle portion forms a central extrusion portion that is offset relative to the first side portion and the second side portion. The middle portion may be substantially flush with a rear plane of the structure when the underride is fully extended. Another embodiment may include one or more sensor brackets, where each sensor bracket may secure a respective sensor of the one or more sensors disposed in the underride. The sensor bracket may include an aperture for receiving the sensor and/or one or more connectors for attaching the sensor bracket to the underride. The one or more connectors for attaching the sensor bracket to the underride may include one or more rivets. In some embodiments, the sensor bracket may include: one or more attachment legs; and one or more connector ends disposed on a respective end of each of the one or more attachment legs; where the one or more connector ends secure a sensor body of the sensor to the sensor bracket.

A method embodiment may include: coupling an underride to a lift linkage mechanism via one or more linkage brackets, where a lift platform is mounted to a structure via the lift linkage mechanism, and where each linkage bracket is rotatably coupled to the lift linkage mechanism; adjusting a distance of the underride relative to the structure via each linkage bracket; and attaching one or more sensors in the underride proximate one or more apertures disposed in the underride; where the one or more sensors remain substantially parallel to a vertical plane at any adjusted distance of the underride relative to the structure. Prior to attaching one or more sensors, the method may include: detaching the one or more sensors from the structure; and relocating the detached one or more sensors to the underride.

In one embodiment, attaching the one or more sensors in the underride may further include: attaching the one or more sensors to one or more sensor brackets; and attaching the one or more sensor brackets to the underride proximate the one or more apertures disposed in the underride. The one or more sensors may remain substantially parallel to a vertical plane during movement of at least one of: the lift platform and the underride.

Another system embodiment may include: a lift platform for mounting to a structure via a lift linkage mechanism; an underride coupled to the lift linkage mechanism via one or more linkage brackets, where each linkage bracket may be rotatably coupled to the lift linkage mechanism, where each linkage bracket may be an arcuate bracket, where each linkage bracket may include one or more holes disposed along a length of the linkage bracket, and where a distance of the underride relative to the structure may be adjustable via the one or more holes of each linkage bracket; one or more apertures disposed in the underride; and one or more sensors disposed in the underride proximate the one or more apertures; where the one or more sensors may remain substantially parallel to a vertical plane at any adjusted distance of the underride relative to the structure.

FIG. 1 shows a perspective view of the lift gate system 100 attached to a vehicle 25, with the lift platform 130 extended at the ground level 28. The platform 130 is loaded with cargo 131. As shown, and as further described later in detail, preferably the underride 150 does not contact the ground level 28 even at its fully lowered (retracted) position. However, in other embodiments the underride 150 may be allowed to come in contact with the ground level 28 without interfering with fully unstowing of the platform 130. The linkage mechanisms 160 are coupled to the support frame 110 using mounting system comprising one or more removable mounting mechanisms 200 (FIG. 6), according to an embodiment.

Figure 2:
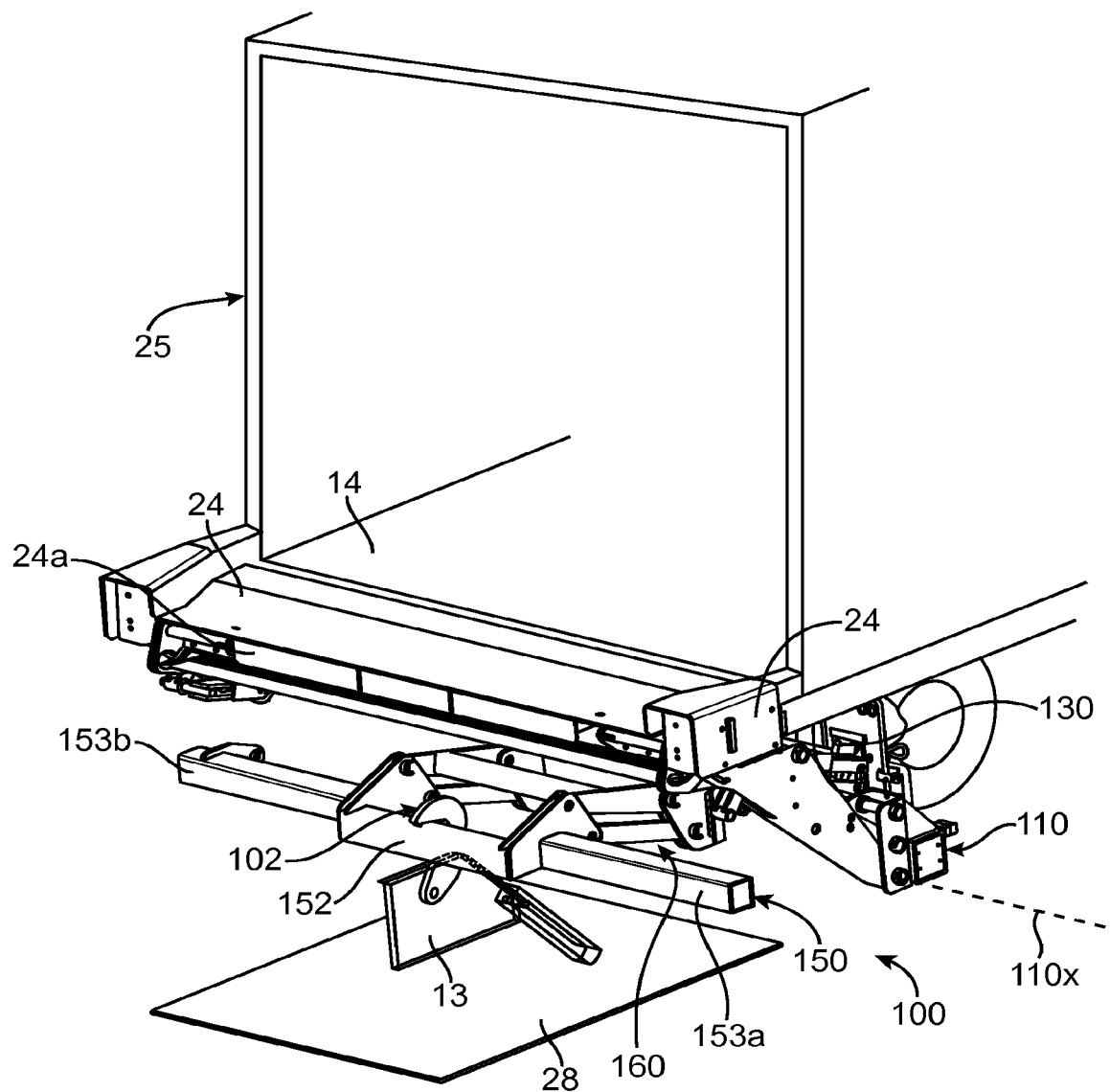
FIG. 2 shows a perspective view of the lift gate system of FIG. 1, locked to a dock lock, according to an embodiment.

FIG. 2 shows a perspective view of the lift gate system of FIG. 1, locked to a dock lock, according to an embodiment. As shown in FIG. 2, in this example, the lift gate system 100 is attached to the vehicle 25 having a vehicle bed 14. An extension plate 24 may be coupled to, and substantially level with, the vehicle bed 14. In FIG. 2, the underride 150 is shown in its extended (raised) position locked to a typical dock lock 102 of a docking station (not shown). The lift platform 130 is in its stowed (tucked) position under the vehicle bed, and the underride 150 is grabbed (locked) by the dock lock 102 extending upwardly from the ground level 28.

Figure 3:
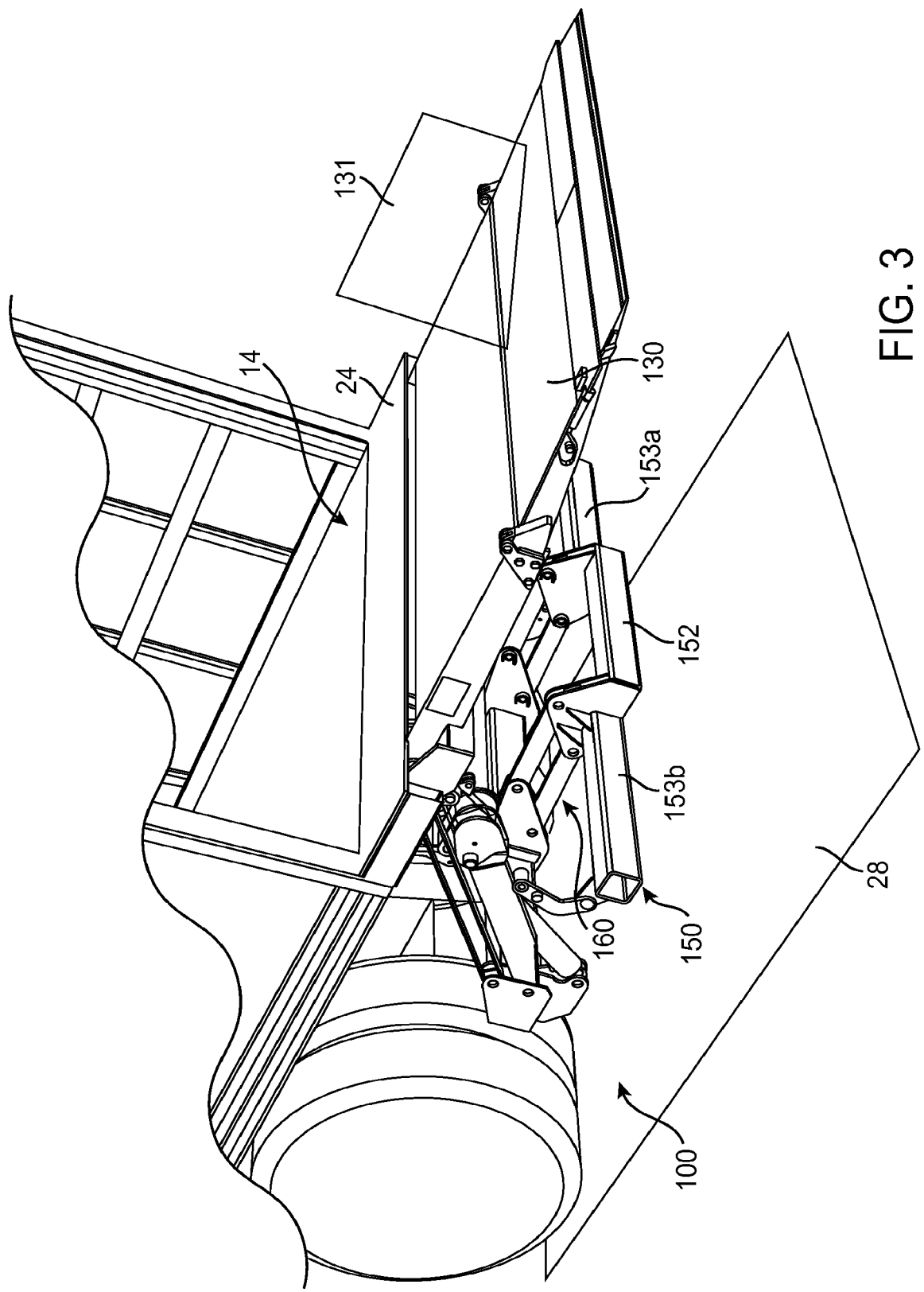
FIG. 3 shows another perspective view of the lift gate system of FIG. 1, with the lift platform raised, according to an embodiment.

FIG. 3 shows a perspective view of the lift gate system 100 with the lift platform 130 extended/unfolded but in a lifted position to move cargo from the vehicle bed into the platform or vice versa. As further described below, during the motion of the lift platform 130, the underride 150 does not interfere with the motion of the lift platform 130 as a result of the configuration of the underride 150, according to an embodiment.

In one embodiment, the underride 150 comprises a generally elongate member which includes a middle portion 152 and side portions 153 a, 153 b. The middle portion 152 forms a central extrusion portion that is offset relative to the first and second portions 153 a, 153 b. The underride 150 can be positioned relative to the lift gate system 100 such that when the underride 150 is fully extended, the portion 152 is substantially flush with the rear plane 24 a (FIG. 2) of the bed 14 (or extension plate 24).

Preferably, the underride 150 is positioned relative to the lift gate system 100 such that when the underride 150 is fully extended (e.g., FIG. 2), the underride portion 152 is compatible with existing dock locks that have a grabbing distance designed for fixed underrides (i.e., the portion 152 within a grabbing distance of a dock lock hook 102 for fixed underrides). The underride 150 is positioned on the lift gate system 100 to be used with dock locks 102 to prevent the vehicle from being pushed away or "seesawing" while the vehicle is parked at a dock or other loading facility.

Figure 4:
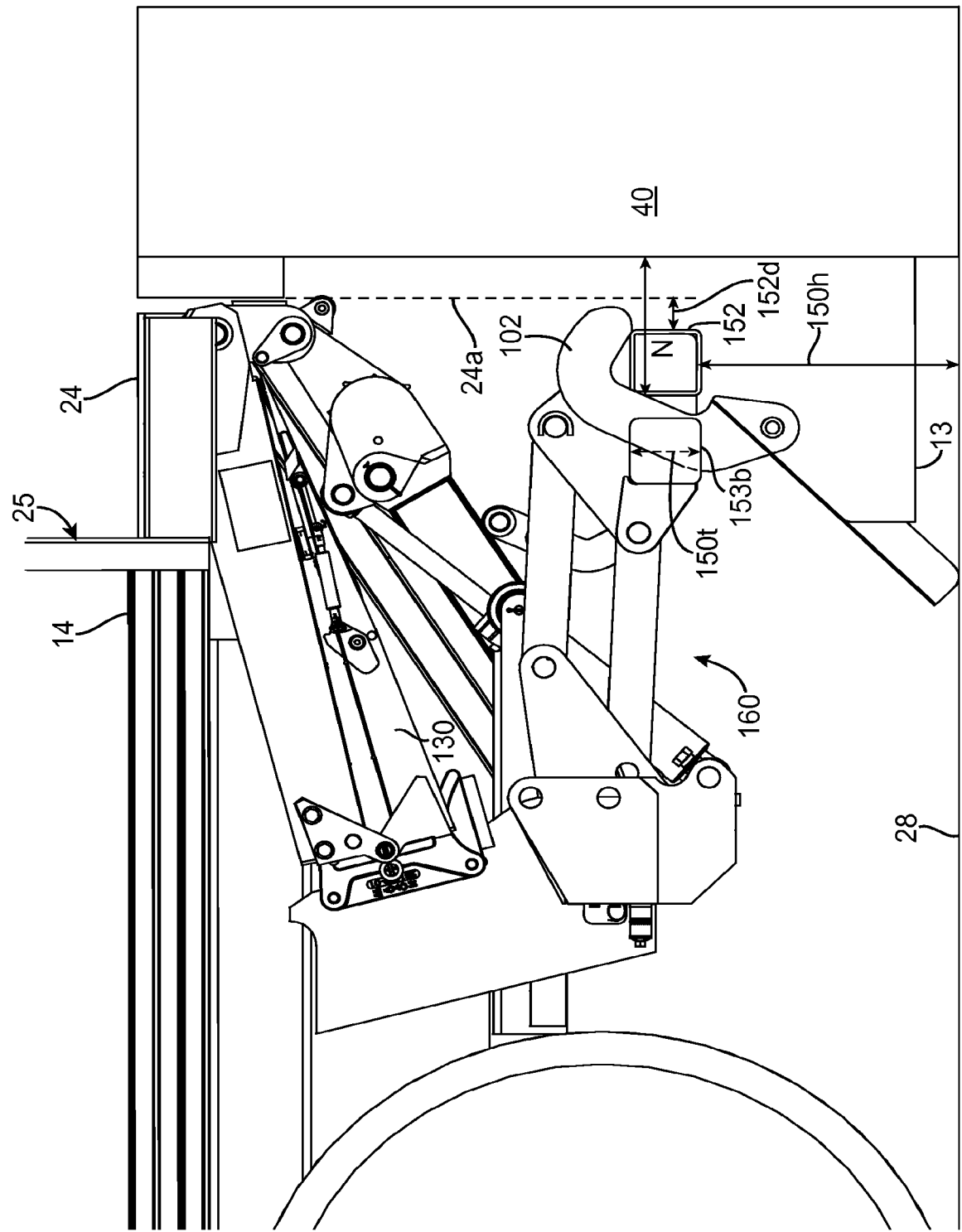
FIG. 4 shows a side view of the lift gate system of FIG. 1, with the underride in its extended (fully raised) position and locked to a dock lock, wherein the lift platform is stowed under the vehicle, according to an embodiment.

FIG. 4 shows a side view of the lift gate system 100 with the underride 150 in its extended (fully raised) position and locked to a dock lock, wherein the lift platform is stowed under the vehicle, according to an embodiment. As shown in FIG. 4, when the underride 150 is in its extended (fully raised) position and the lift platform 130 is stowed, the extrusion 152 of the underride 150 has a horizontal distance 152 d from the rear end plane 24 a of the vehicle. In one example, the height 150 h of the fully extended (raised) underride 150 above the ground 28 is less than 22 inches (i.e., about 55 CM). The thickness 150 t of the underride 150 is about 4 inches (i.e., about 10 CM). Other dimensions for the underride 150 are possible. The docking station 40 has a retention 13 and the dock lock 102 resides substantially in the retention 13.

Figure 6:
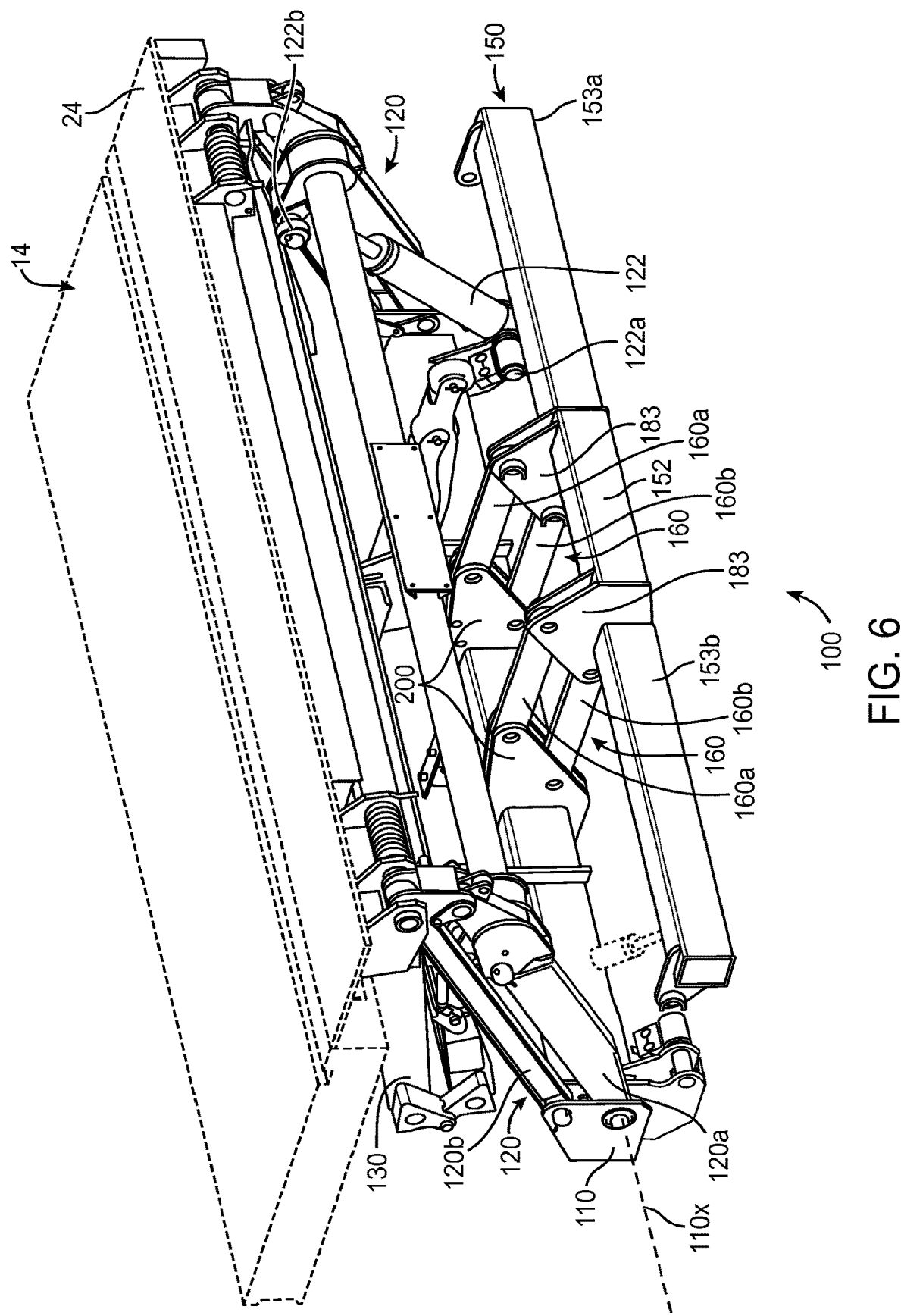
FIG. 6 shows another perspective view of the lift gate system of FIG. 1, with the underride in an extended position, wherein the lift platform is stowed under the vehicle, according to an embodiment.

The distance 152 d in accordance with one embodiment is less than about 8 inches (i.e., about 20 CM), preferably less than 4 inches (i.e., about 10 CM) and most preferably essentially flush with the plane 24 a. It is also possible for the extrusion portion 152 to extend beyond the rear end plane 24 a when the underride 150 is in a fully raised (fully extended) position, wherein the distance 152 d is measured accordingly. This can be accomplished, for example, by offsetting the extrusion portion 152 further out from the side portions 153 a, 153 b of the underride, or by increasing lengths of linkage arms 160 a, 160 b (FIG. 6). In this embodiment, the underride 150 remains clear of the proper operation of the lift stowing/unstowing while remaining within the grabbing distance N of a dock lock 102 and does not interfere with docking, according to one embodiment.

FIG. 6 shows an embodiment of the lift gate system 100, fully stowed and the underride 150 fully extended (raised). The lift gate system 100 is coupled to an elongate frame 110, wherein the lift platform 130 is coupled to the frame 110 using platform-carrying linkage mechanisms 120, at each end of the frame 110. The frame 110 is fixed relative to the vehicle and can either be a component of the lift gate system 100 or part of the vehicle itself (or a separately attached fixed frame) independent of the lift gate system. Each linkage mechanism 120 includes parallelogram linkages 120 a, 120 b, and may be coupled to the frame 110 at positions other than the ends of the frame 110.

The lift gate system 100 further includes a pair of removable mounting mechanisms 200 for the linkage mechanisms 160, wherein the mounting mechanisms 200 allow the underride 150 supported by the linkage mechanisms 160, to be installed/mounted to the frame 110.

The lift gate system 100 further includes an actuator 122 (such as a hydraulic actuator) which is coupled between the frame 110 and the lift platform 130. In one embodiment, the actuator 122 is coupled to the frame 110 via a rotatable joint 122 a, and the actuator 122 is coupled to the lift platform linkage 120 via a rotatable joint 122 b. The actuator 122 moves the lift platform 130 from a stowed position to an unstowed position, and vice versa. The frame 110 remains fixed in relation to the vehicle bed 14, and each linkage mechanism 120 at each end of the frame 110 allows the platform 130 to be raised/lowered by the actuator 122, while the platform 130 revolves about the long axis 110 x through the frame 110 via the linkage mechanisms 120.

The linkages 120 a, 120 b (FIG. 5) are elements of a parallelogram such that when the platform 130 is being raised or lowered, the platform 130 keeps substantially parallel to the ground level 28 by the action of the linkage mechanisms 120. The underride 150 revolves about the long axis of the frame 110 via the linkage mechanisms 160, while the platform 130 also revolves about the long axis of the frame 110 via the platform linkage mechanisms 120, both under the action of the actuator 122.

The underride 150 is rotatably coupled by the underride linkage mechanisms 160 to the frame 110 via said removable mounting mechanisms 200. Each underride linkage mechanism 160 allows raising (extending) and lowering (retracting) the underride 150 to prevent interference with the motion of the platform 130 when the platform 130 is being stowed, unstowed, raised, or lowered by the actuator 122. In one example, the actuator 122 may also be used to raise or lower the underride 150 via the linkage mechanisms 160, at the same time as raising or lowering the platform 130.

In one embodiment, each underride linkage mechanism 160 comprises a parallelogram linkage as shown (other suitable linkage mechanisms may be used). Each linkage mechanism 160 is configured such that when the underride 150 is fully raised, the underride 150 is within the typical grabbing distance N of a dock lock 102 from a dock 40.

The underride 150 itself and/or the underride linkage mechanisms 160 may be also be coupled to the platform linkage mechanisms 120 such that when the platform linkage mechanisms 120 raise or lower the platform 130 through the action of one or more actuators 122, the underride 150 is also raised or lowered by revolving around the frame 110 via the linkage mechanisms 160. As such, the underride 150 essentially co-revolves with the platform 130 about the long axis 110 x of the frame 110 by the action of the actuator 122.

Figure 5:
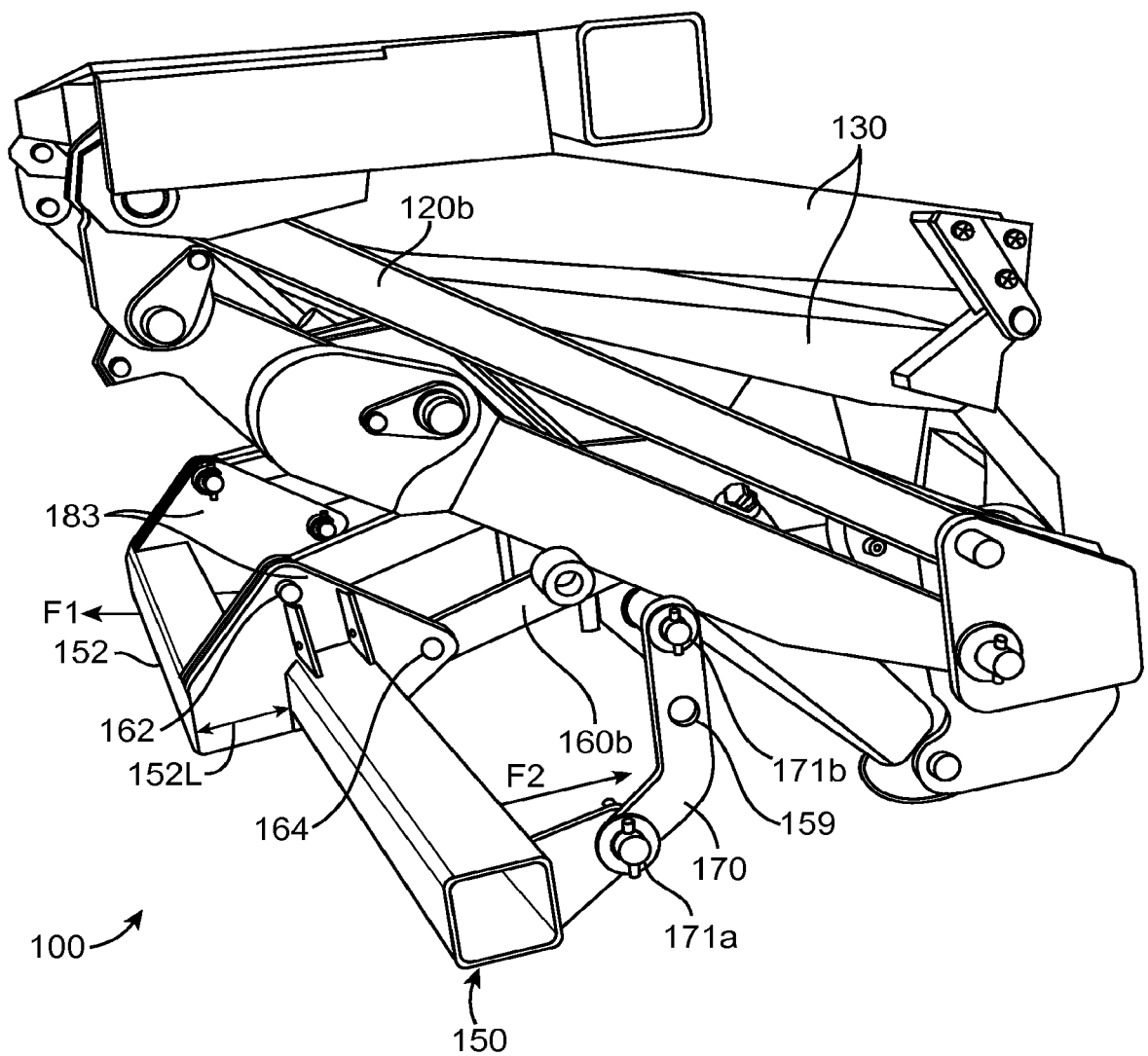
FIG. 5 shows another perspective view of the lift gate system of FIG. 1, with the underride in an extended position, wherein the lift platform is stowed under the vehicle, according to an embodiment.

FIG. 5 shows another perspective view of the lift gate system 100 with the underride in an extended position, wherein the lift platform is stowed under the vehicle, according to an embodiment. In this embodiment, the underride 150 and/or linkage mechanisms 160 may be coupled to the platform linkage mechanisms 120 with a bracket 170. The coupling to bracket 170 is adjustable so that the distance of the underride 150 relative to the ground 28 can be changed to accommodate different vehicle bed heights.

A dock lock 102 may exert a horizontal force F1 on the extrusion portion 152 of the underride 150. Depending on the configuration of the underride 150 and the underride linkage mechanisms 160, the underride linkage mechanisms 160 may not be extended in the exact direction of the force F1. If so, a lever effect exists at the pivot points 162 and 164 on the underride linkage mechanisms 160. The bracket 170 provides a balancing force F2 on the underride 150 to balance such a lever effect.

The actuator 122 can drive the platform 130 up and down to load and unload goods, while the platform 130 keeps substantially parallel to the ground level by the platform linkage 120. The underride 150 revolves about the long axis of the frame 110 via the linkage mechanisms 160, while the platform 130 also revolves about the long axis of the frame 110 via the platform linkage mechanisms 120, by the action of the actuator 122 through the platform linkage 120 that couples with the underride 150 and with the actuator 122.

As shown, relative to the extrusion portion 152, the first and second portions 153 a, 153 b of the underride 150 are effectively offset backward, by a distance 152L away from the extrusion 152, and towards the vehicle, providing a clearance between the platform linkage 120 and the underride 150.

Figure 7:
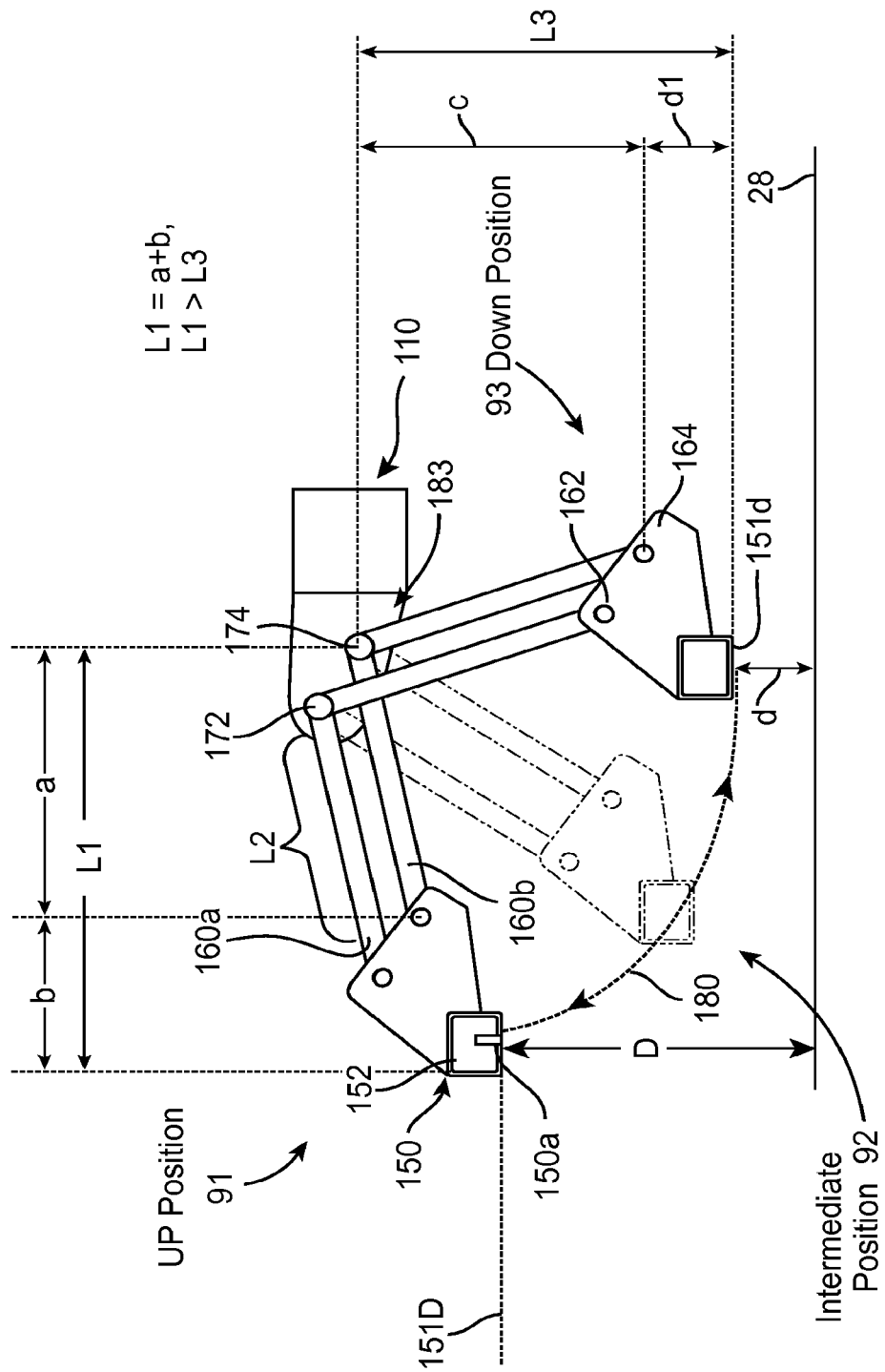
FIG. 7 illustrates a side view of the underride of the lift gate system of FIG. 1 moving between different positions, according to an embodiment.

FIG. 7 illustrates side view of the underride 150 moving from an Up Position (raised or extended) 91 to an Intermediate position 92 and then to a Down Position (lowered or retracted) 93. The platform 130 is not shown. In the Up Position 91, the lower surface 150 a of the underride 150 defines a plane 151 d having a clearance D from the ground level 28, as discussed. In the Down Position 93, the lower surface 150 a defines a plane 151 d having a clearance d from the ground level 28 as discussed.

An underride linkage mechanism 160 is shown as a parallelogram having two linkage arms 160 a, 160 b, which are coupled to the underride 150 at a first set of pivot points 162, 164 on adjustable and removable mounting mechanisms 200, and are coupled to the frame 110 at a second set of pivot points 172, 174 on a parallelogram coupler 183. As a result of using the parallelogram linkage mechanism 160, the plane of the underride 150 maintains the same angle (e.g., substantially parallel) relative to the ground level 28 as the underride 150 moves. The underride 150 can have a rectangular cross section with the surface 150 a parallel to ground.

In addition, as a result of using the extrusion portion 152 together with the adjustable and removable mounting mechanisms 200, the effective arm length L1 of the underride 150 is extended (to lock to the dock lock 102 via the extrusion portion 152) as compared with the arm length L2 of the linkage 160. At the Up Position 91 of the underride 150 (corresponding to the stowed position of the lift), it is desirable to have the maximum length for the convenience of locking the underride 150 on to a dock lock 102 without the need for an operator to go deep under the vehicle bed when manual operation of the dock lock 102 is required.

Further as a result of using the second set of pivot points 172, 174, and the first set of pivot points 162, 164, the underride 150 moves around both first and second sets of pivot points, such that the resulting rotation trajectory 180 around the long axis 110 x of the frame 110 is non-circular (axis 110 x is perpendicular to the plane of the drawing page). The trajectory 180 of the underride lower surface 150 a, as seen from the Up Position 91, to the Intermediate position 92, and Down Position 93, flattens (reaches a minimum plateau) near the ground level 28. Such a flattened trajectory 180 helps control the clearance d and avoids having the underride 150 hit the ground 28 or interfere with fully unstowing the platform 130 to the ground 28.

Due to the action of the underride linkage mechanism 160, in the Up Position 91 of the underride 150, the horizontal distance L1 (generally parallel to the ground 28) is equal to the sum of distances a and b (i.e., L1=a+b). The distance L1=a+b, represents said first distance between the underride 150 and the frame 110 when the underride 150 is in the Up Position 91. A vertical distance L3 (generally perpendicular to the ground 28) represents said second distance between the underride 150 and the frame 110 when the underride 150 is in the Down Position 93. In the Down Position 93, the vertical distance L3 is the sum of distances c and d1 (L3=c+d1) is less than the horizontal L1=a+b, wherein L1>L3 (i.e., (a+b)>(c+d1)).

In the Up Position 91, the distance a is the horizontal distance between pivot points 174 and 164, and the distance b is the horizontal distance between pivot 164 and the front surface of the extrusion 152 of the underride 150. In the Down Position 93, the distance c is the vertical distance between pivot points 174 and 164, and the distance d1 is the vertical distance between pivot point 164 and the bottom surface of the extrusion 152 of the underride 150.

Though a parallelogram linkage mechanism 160 is shown by example, other underride linkage mechanisms between the underride 150 and the frame 110 may be used according to the present invention. The underride linkage mechanism 160 can be of other configurations and have more or fewer linkage arms, such that in the extended position, the underride (at pivot points 162, 164) is at a first distance (L1) from the frame (at pivot points 172, 174), and in the retracted position, the underride (at pivot points 162, 164) is at a second distance (L3) from the frame (at pivot points 172, 174), such that said first distance (for the extended position) is larger than the second distance (for the retracted position).

The action of the underride linkage mechanism provides that when the underride 150 is extended, the horizontal distance (e.g., L1) between the underride 150 and its support frame 110 is larger than the vertical distance (e.g., L3) between the underride 150 and its support frame 110 when the underride is retracted. This has the effect that as the underride 150 moves from its extended position to its retracted position, the effective distance between the underride 150 and the frame 110 is reduced in a way to bring the underride 150 closer to the support frame 110.

The underride linkage mechanism 160 can therefore be selected to provide varying effective distance between the underride 150 and the frame 110, as the underride 150 moves from the extended position 91 to the retracted position 93. The distances L1 and L3 can be varied at least by varying one or more of: (1) the lengths of the linkage arms 160 a, 160 b, (2) the vertical and/or horizontal distance between the pivot points 162, 164, (3) the vertical and/or horizontal distance between the pivot points 172, 174, (4) shape and dimensions of the adjustable and removable mounting mechanisms 200, (5) placement of the underride 150 on the adjustable and removable mounting mechanisms 200 as coupler 183, (6) shape and dimensions of the coupler 183, (7) placement of the underride 152 on the coupler 183.

When the underride system is coupled to a vehicle, the underride linkage mechanism geometry can be selected such that in the extended position the underride 150 is proximate the rear end plane of the vehicle, and when the underride 150 is retracted, the distance between the underride 150 and the frame is reduced (relative to the extended position), such that the underride 150 does not contact the ground in a manner that prevents fully retracting the underride 150 or fully unstowing a connected stow lift platform to the ground.

Figure 9:
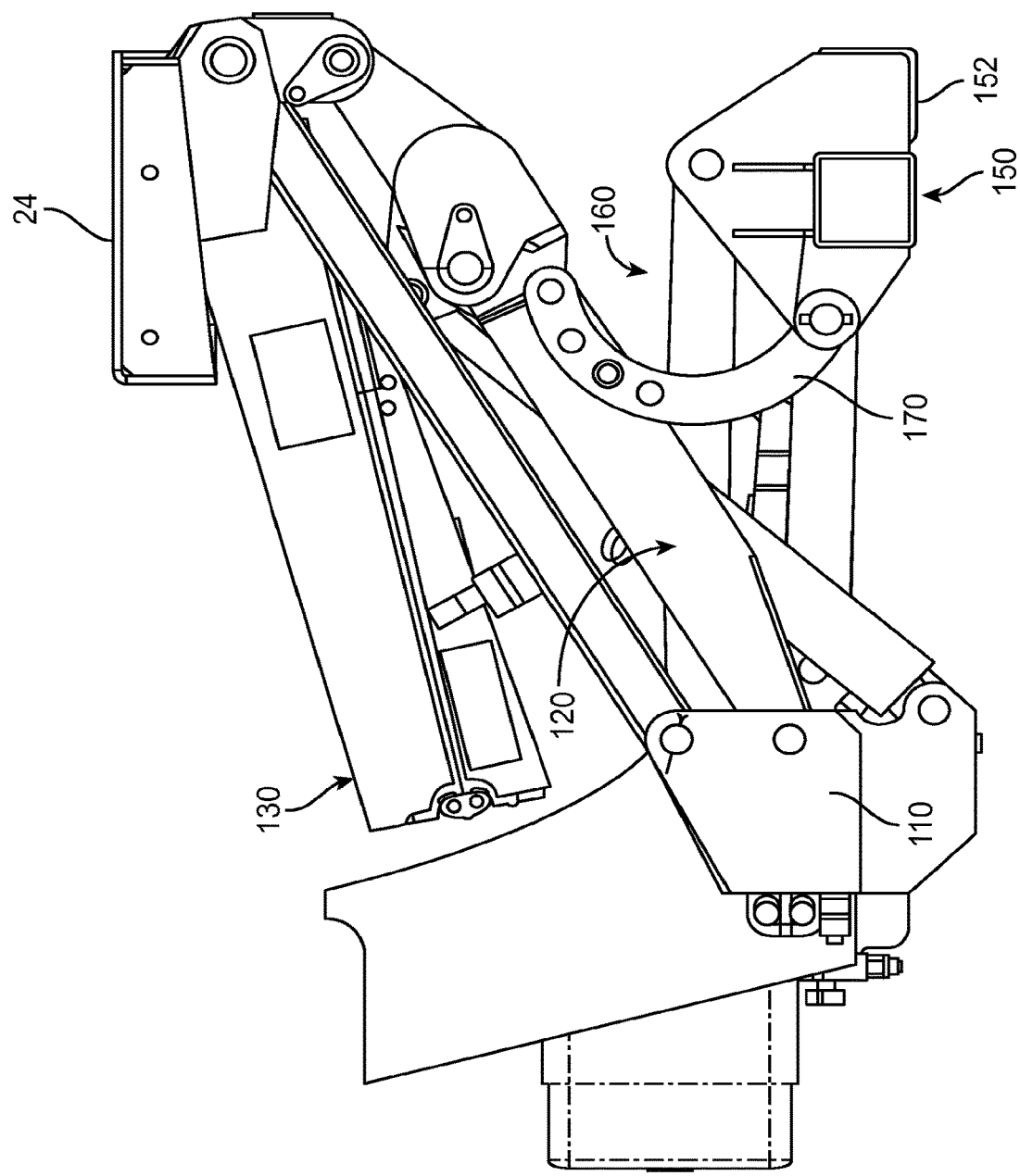
FIG. 9 shows a side view of the lift gate system of FIG. 1 with folded platform and the lift gate stowed under the vehicle bed, wherein a lift gate bracket for the underride linkage allows different ground clearance levels for the lift gate components, according to an embodiment.

FIG. 9 shows a side view of the lift gate system 100 with folded platform 130 and the lift gate tucked (stowed) under the vehicle bed, wherein the bracket 170 includes e.g., four holes (HOLE #1, . . . , HOLE #4) along the length of the arcuate bracket 170, wherein attaching the bracket 170 to the linkage 120 via each hole provides a different ground clearance, as shown in FIG. 9. There can be different number of holes for different ground clearance options. In one example, the information in the legend in FIG. 9 is used to position the dock lock bumper 150 at proper underride position using the brackets 170, based on the bed height of the vehicle (e.g., truck or trailer).

The position of the platform linkage mechanism 120 on the bracket 170 can be adjusted such that, even though the vehicle bed 14 may be at a higher height from the ground 28, the extended (raised) underride 150 is at about the same height D from the ground 28 (FIG. 7). This allows maintaining the height of the underride 150 from the ground 28 at a desirable level to be compatible with different height trucks, vehicle beds, and heights standard dock locks 102 from ground, regardless of vehicle size or distance of the vehicle bed 14 to the ground.

Each bracket 170 is adjustable such that the distance of the underride 150 to the ground 28 (when the lift gate system 100 is stowed and the underride 150 is raised), can be changed or maintained for different vehicle bed heights.

As shown in FIG. 5, each bracket 170 has two ends with spaced holes 159 therebetween along the length of the bracket 170. Each bracket 170 has one or more openings/holes 159, through which a pin 171 a is inserted (FIG. 10A), thus rotatably coupling the bracket 170 with the underride 150. Further, each bracket 170 is rotatably attached to the linkage mechanism 120 via one of the holes 159 using a pin 171 b. By selecting among the holes 159 at various positions, the position of the underride 150 relative to the vehicle bed 14 can be adjusted.

In an alternative embodiment, the underride 150 and/or underride linkage mechanisms 160 may be moved by an optional independent underride actuator 123 (FIG. 6). The underride 150 may then be raised and lowered independently of the platform 130, wherein the bracket 170 is unnecessary. Alternatively, the underride 150 may be slidably or telescopically coupled underneath the vehicle bed 14, and the underride 150 may be extended and retracted by an actuator or other device independent of the platform 130.

Figure 8:
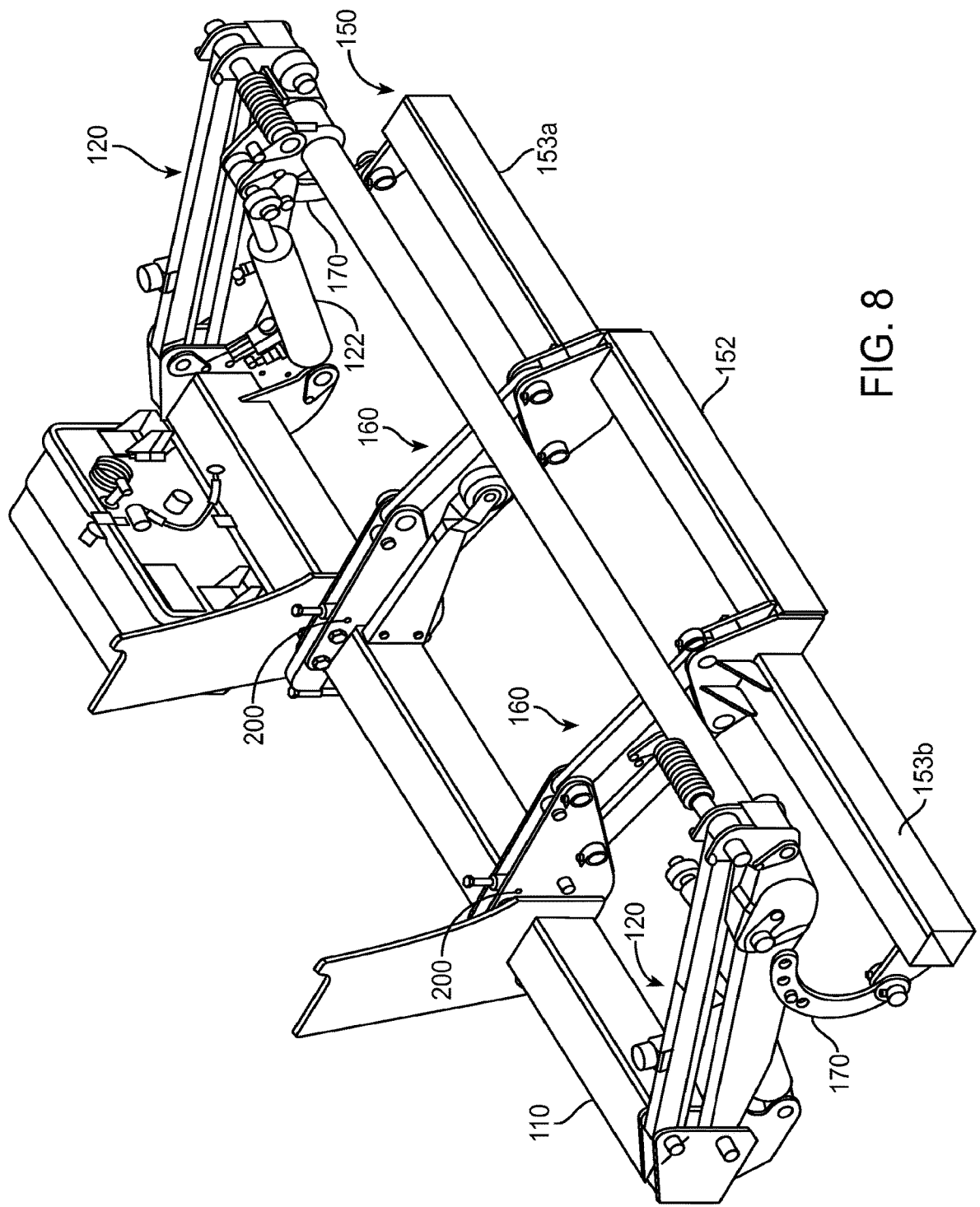
FIG. 8 shows a perspective view of the lift gate system of FIG. 1 with the underride attached to a frame of the vehicle (not shown) using removable mounting mechanisms for coupling/mounting the underride to the vehicle, according to an embodiment.

FIG. 8 illustrates a perspective view of a pair of removable mounting mechanisms 200, as mounted on the fixed frame 110, according to an embodiment. The mounting mechanisms 200 support the linkage 160 which in turn supports the underride 150 (the lift platform is not shown in FIG. 8).

Figure 10:
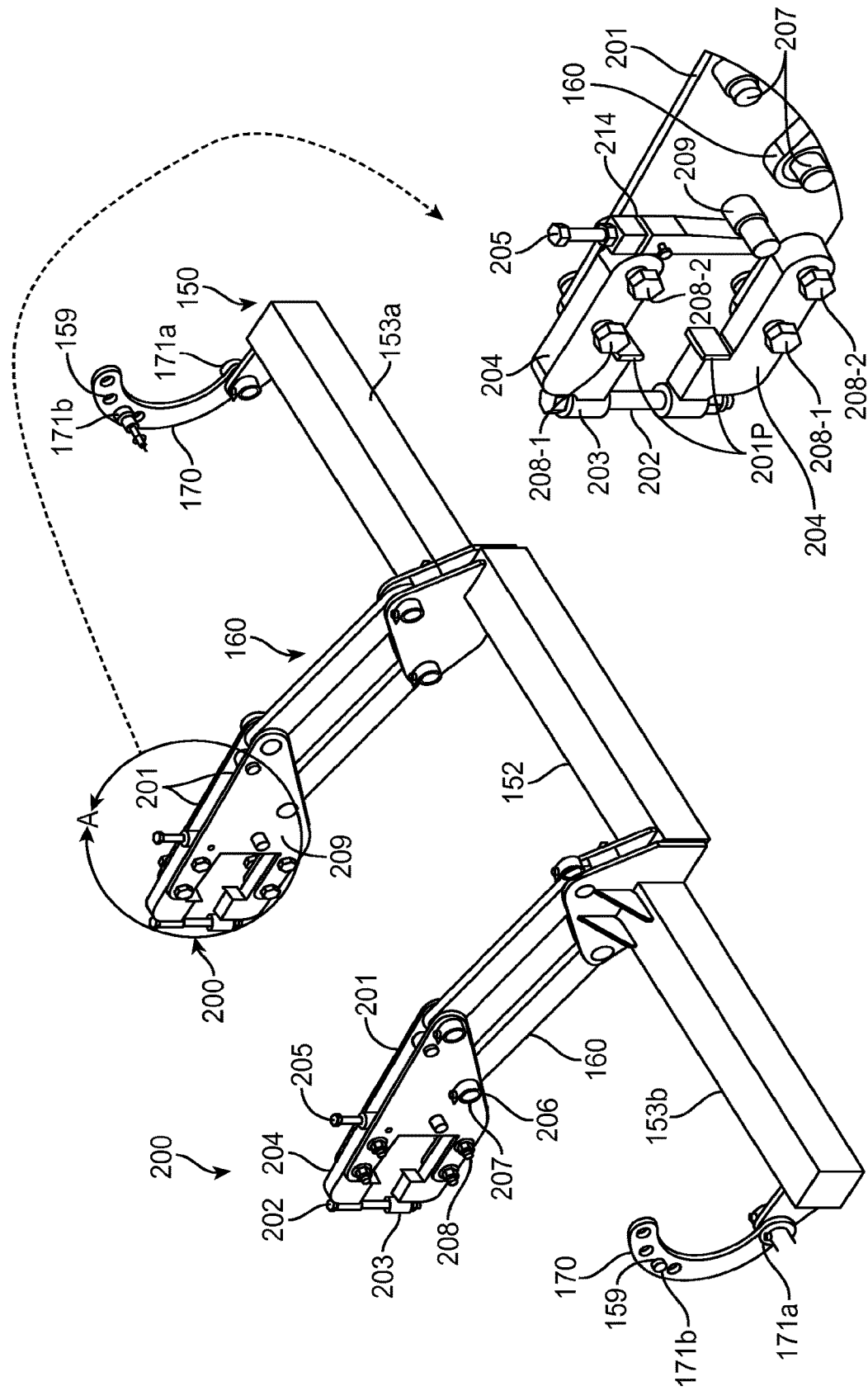
FIG. 10A shows a perspective view of the lift gate underride and mounting mechanisms of FIG. 8 for mounting on a vehicle, according to an embodiment.
FIG. 10B shows details of a mounting mechanism of FIG. 10A, according to an embodiment.
Figure 11:
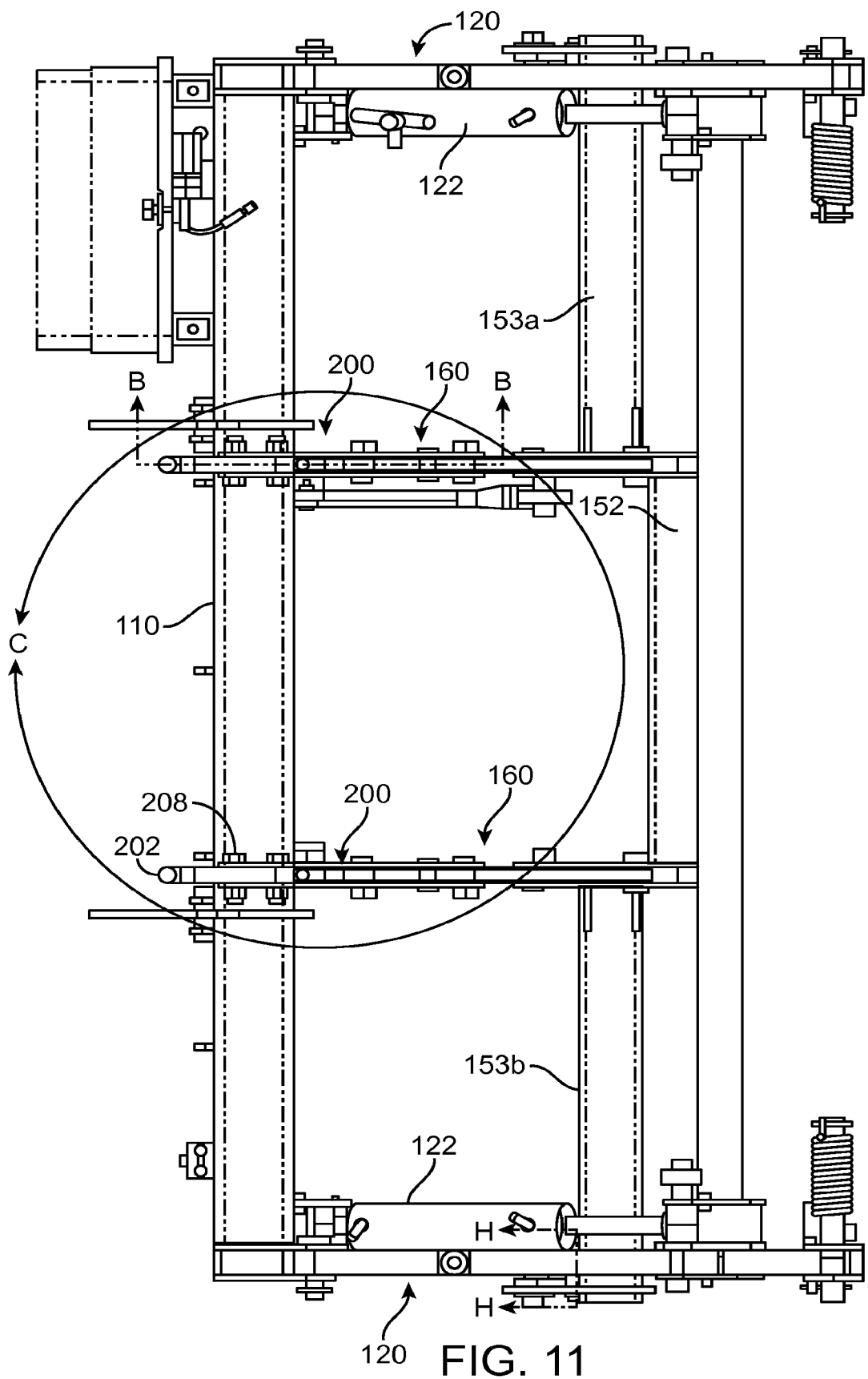
FIG. 11 shows a top view of the lift gate underride and mounting mechanisms of FIG. 8, according to one embodiment.
Figure 21:
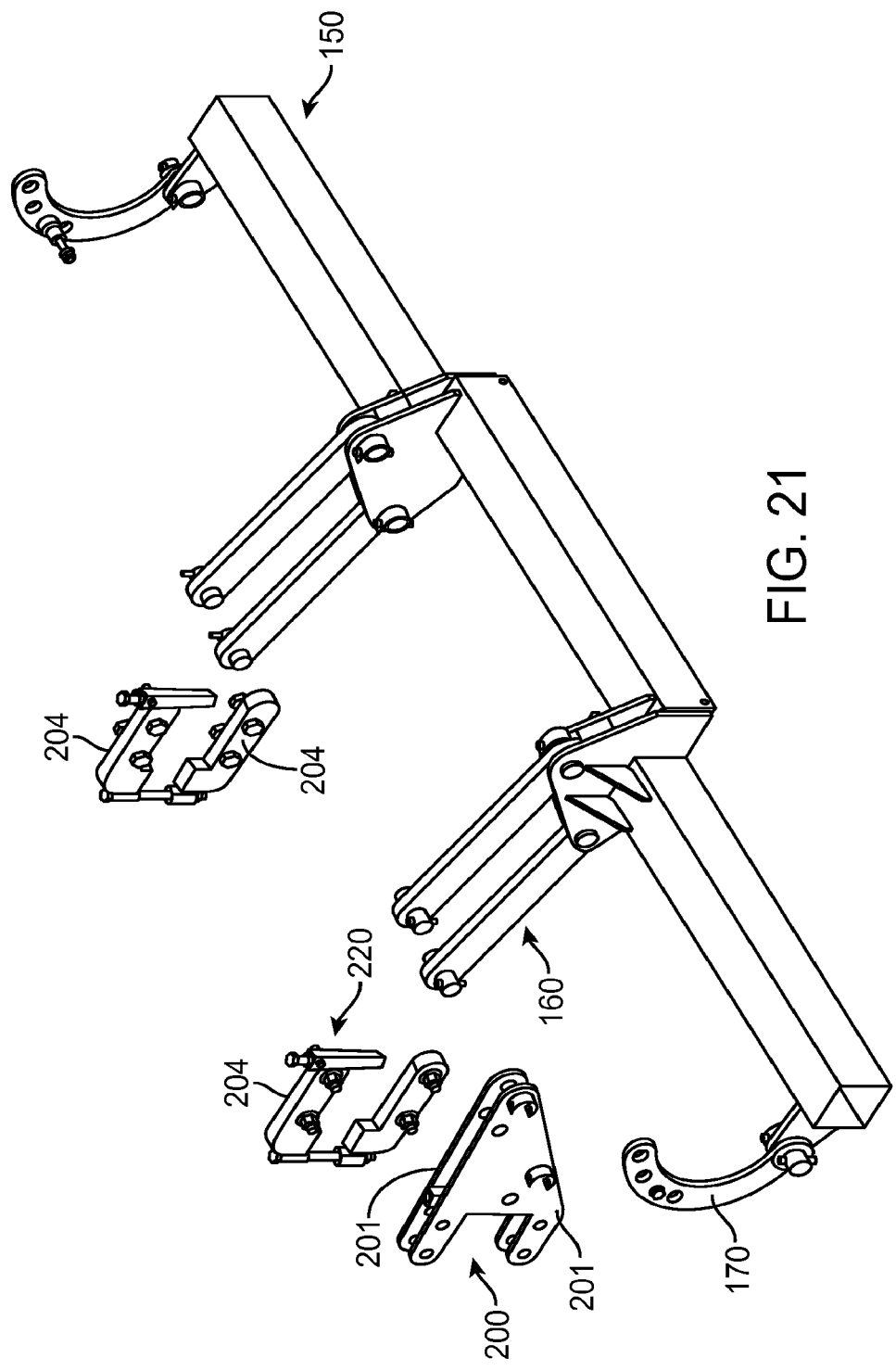
FIG. 21 shows an exploded view of the mounting mechanism and underride system, according to one embodiment.

FIG. 10A illustrates a perspective view of the mounting mechanisms 200, dismounted (removed) from the fixed frame 110. FIG. 10B illustrates details of a mounting mechanism 200, according to an embodiment. FIG. 11 shows a top view of the lift gate system (the platform 130 not shown for clarity), wherein the removable mounting mechanisms 200 are mounted on the frame 110. FIG. 21 shows an exploded view of the mounting mechanism 200 and underride system 150, according to one embodiment.

Figure 12:
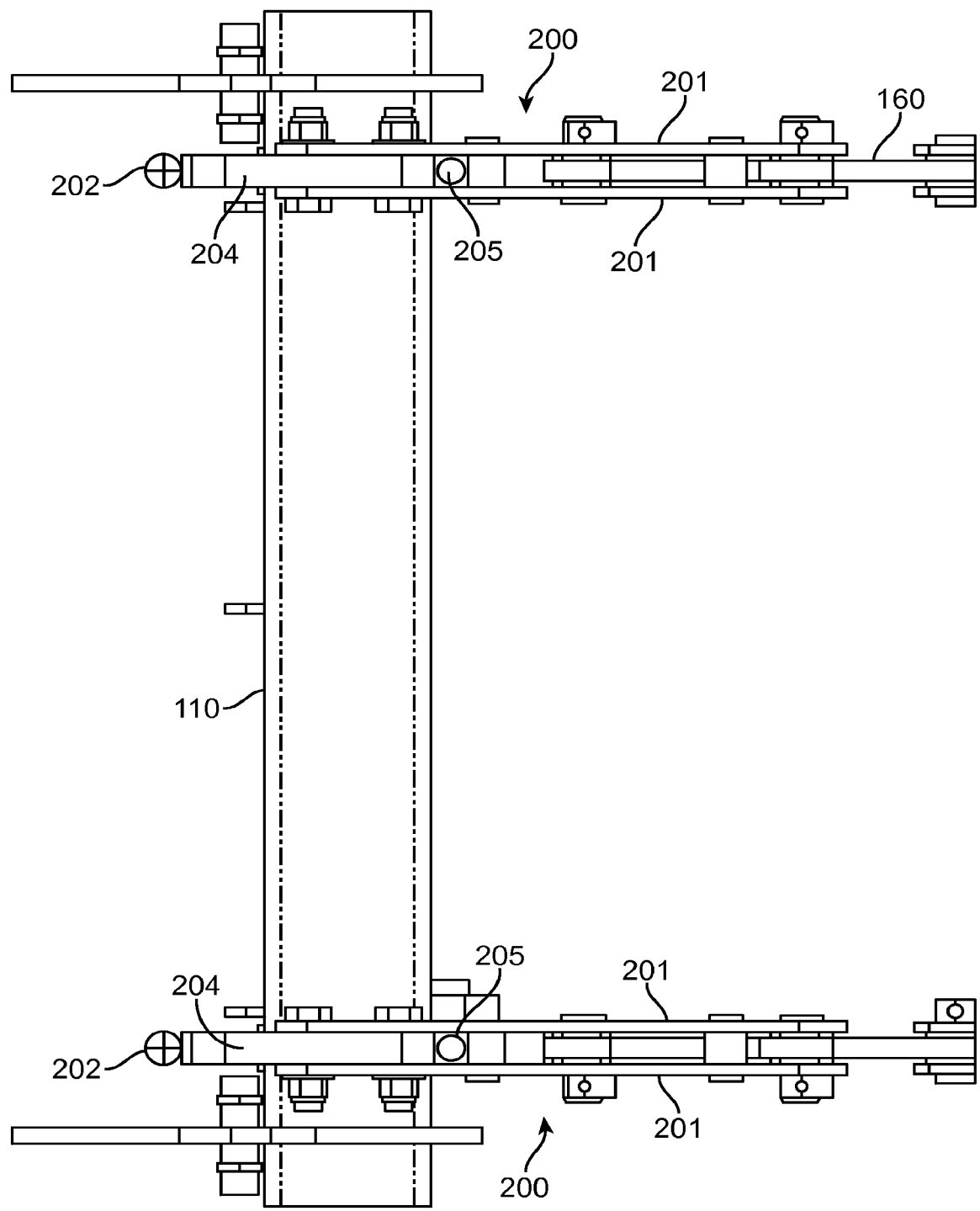
FIG. 12 shows a more detailed top view of attachment of the removable mounting mechanisms to a vehicle frame, as indicated by circular detail C of FIG. 11, according to one embodiment.
Figure 13:
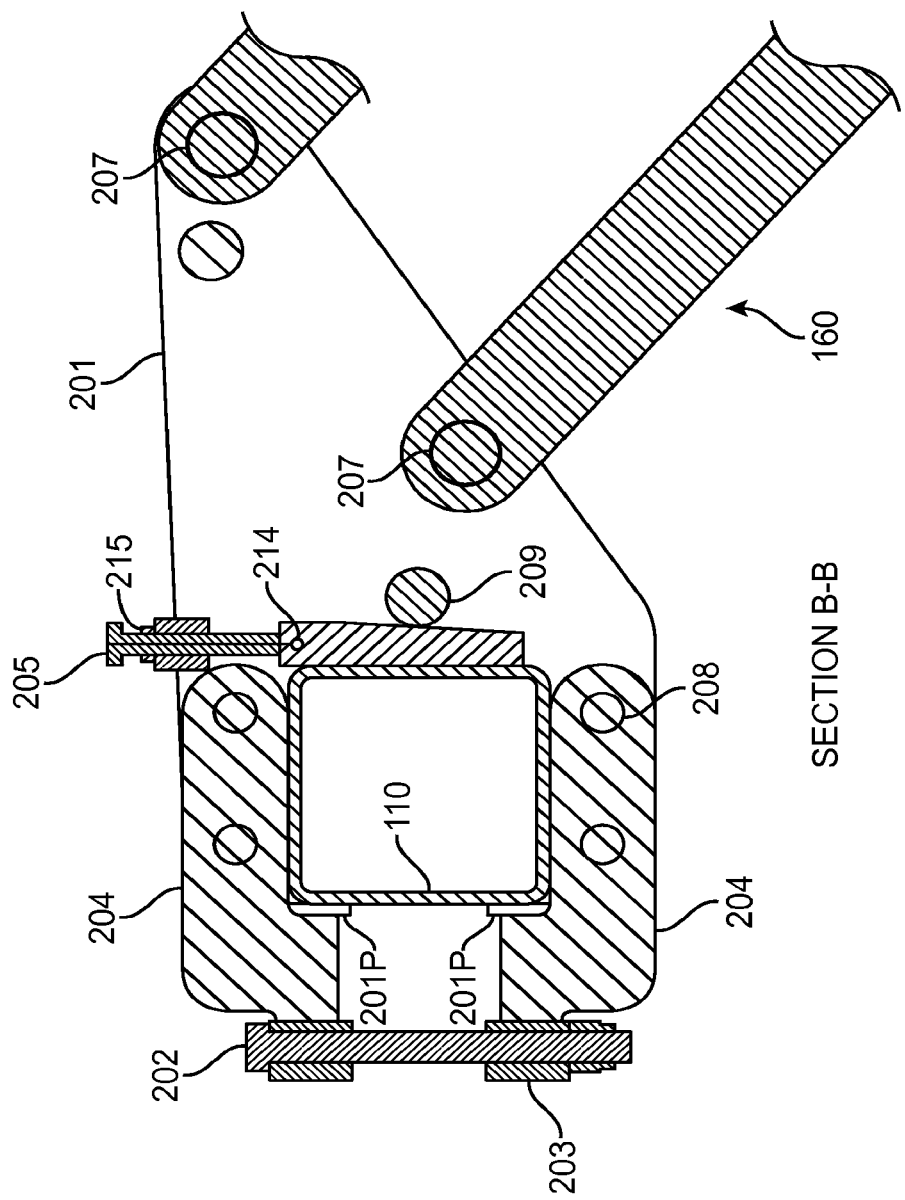
FIG. 13 shows a cross-section view of a removable mounting mechanism as attached to the vehicle frame, as indicated by section lines B-B of FIG. 11, according to one embodiment.

FIG. 12 shows a more detailed top view of attachment of the removable mounting mechanisms 200 to the frame 110, as indicated by circular detail C of FIG. 11. FIG. 13 shows a cross-section view of a removable mounting mechanism 200 as attached to the frame 110, as indicated by section lines B-B of FIG. 11.

Each mounting mechanism 200 comprises a pair of generally planar brackets 201 connected in parallel via screws 208, and spaced by a pair of moveable clamping jaws 204 sandwiched therebetween. In one embodiment, each jaw comprises an L-shaped jaw element.

In one embodiment, each bracket 201 includes a U-shaped interior edge 201 e (FIGS. 17B and 18) to which the jaws 204 are attached. Further, each bracket 201 includes an angled edge 201 a (essentially opposite the edge 201 e) to which the underride system can be rotatably coupled. Each mounting mechanism is adjustable and removable from the vehicle frame.

The pair of jaws 204 are attached to the brackets 201 using screws 208, wherein a portion of each jaw 204 is sandwiched between the brackets 201 proximate each U-shaped edge 201 e. The jaws 204 and the edges 201 e of brackets 201 provide a jaw opening therebetween, wherein the jaw opening is shaped to receive the frame 110.

In one embodiment, the jaw opening is essentially rectangular to receive a frame 110 with a rectangular (e.g., square) cross-section. In another embodiment, the edges 201 e of the brackets 201 and the jaws 204 can be shaped such that when assembled, the brackets 201 and jaws 204 provide a jaw opening that is essentially circular to receive a frame 110 with a circular cross-section (e.g., essentially curved edge 201 e and jaws 204 with curved edges (i.e., edges which contact the frame 110) corresponding to cross-section of the frame 110. As such the shape and dimensions of the edges 201 e of the brackets 201 and the jaws 204 are selected based on the sectional shape and dimensions of the frame 110.

Figure 19:
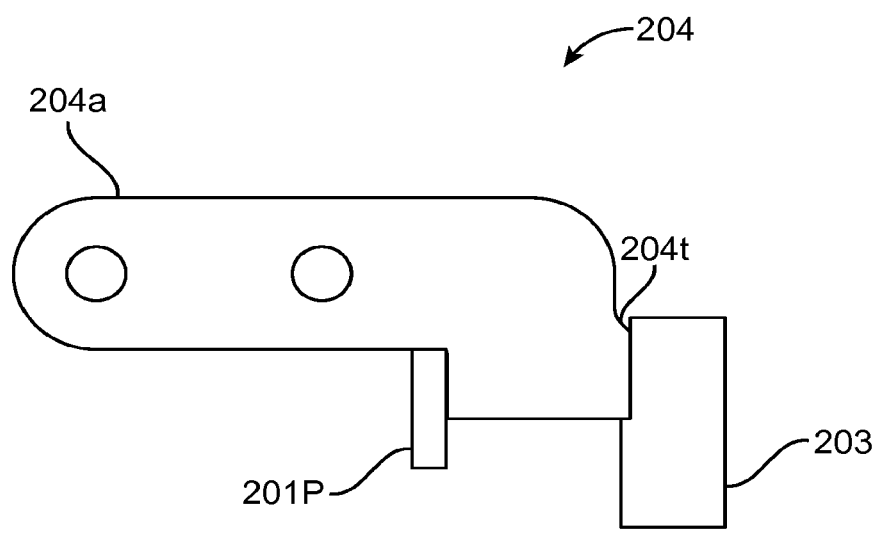
FIG. 19 shows a side view of the clamping jaw in FIG. 18, according to one embodiment.

Further, each jaw 204 is adjustably attached to each plate 201 via an attachment portion 204 a of the jaw (FIG. 19). The mounting mechanism further includes am adjustable fastening mechanism for the jaws 204. In one embodiment of the fastening mechanism, each jaw 204 includes an annular extension 203 at a tip portion 204 t of the jaw 204 (FIG. 19) for receiving a tightening screw 202 therethrough. When each mounting mechanism 200 is mounted on the frame 110 (such that the frame 110 is disposed in the jaw openings), the screw 202 is tightened into the annular extension 203 via nut to urge the tip portions 204 *t* (FIG. 19) of the jaws 204 towards each other to fasten the tips of the jaw 204, to tightly engage and hold the frame 110.

Each jaw 204 may further include an optional a jaw plate 201P facing the U-shaped edges 201 *e* of the corresponding brackets 201.

Distal ends of each linkage mechanism 160 are rotatably coupled to a corresponding mounting mechanism 200 via a pair of pins 207 and fasteners 206 on angled edges 201 *a* of the brackets 201. Specifically, said distal ends of a linkage mechanism 160 are sandwiched between the pair of brackets 201 of the mounting mechanism 200, wherein each pin 207 passes through corresponding openings in the brackets 201 and aligned openings in the distal end of the linkage mechanism 160. Each fastener 206 maintains the corresponding pin 207 in place in the brackets 201.

Figure 14:
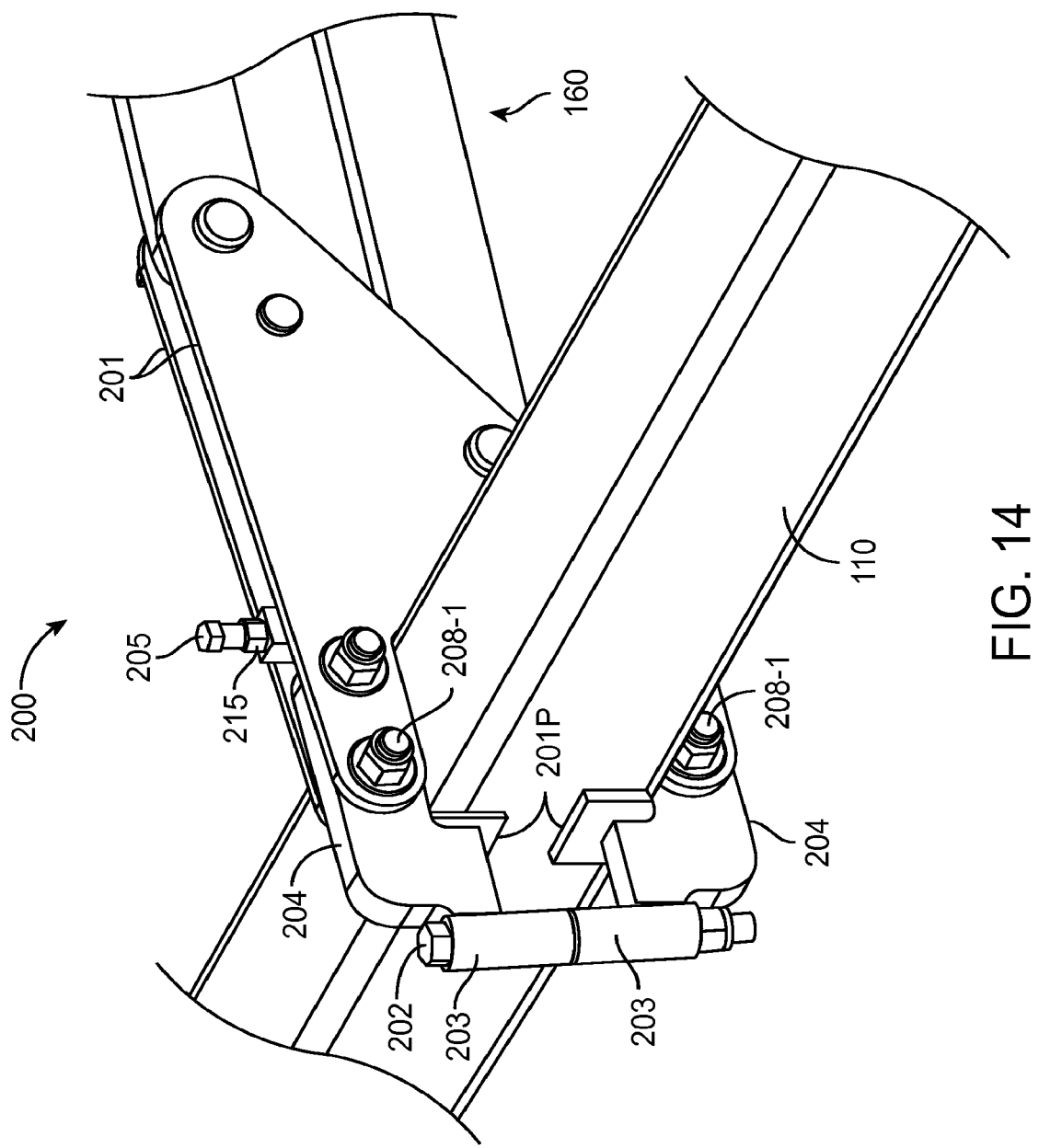
FIG. 14 shows another perspective view of a removable mounting mechanism as mounted on a frame, according to one embodiment.
Figure 15:
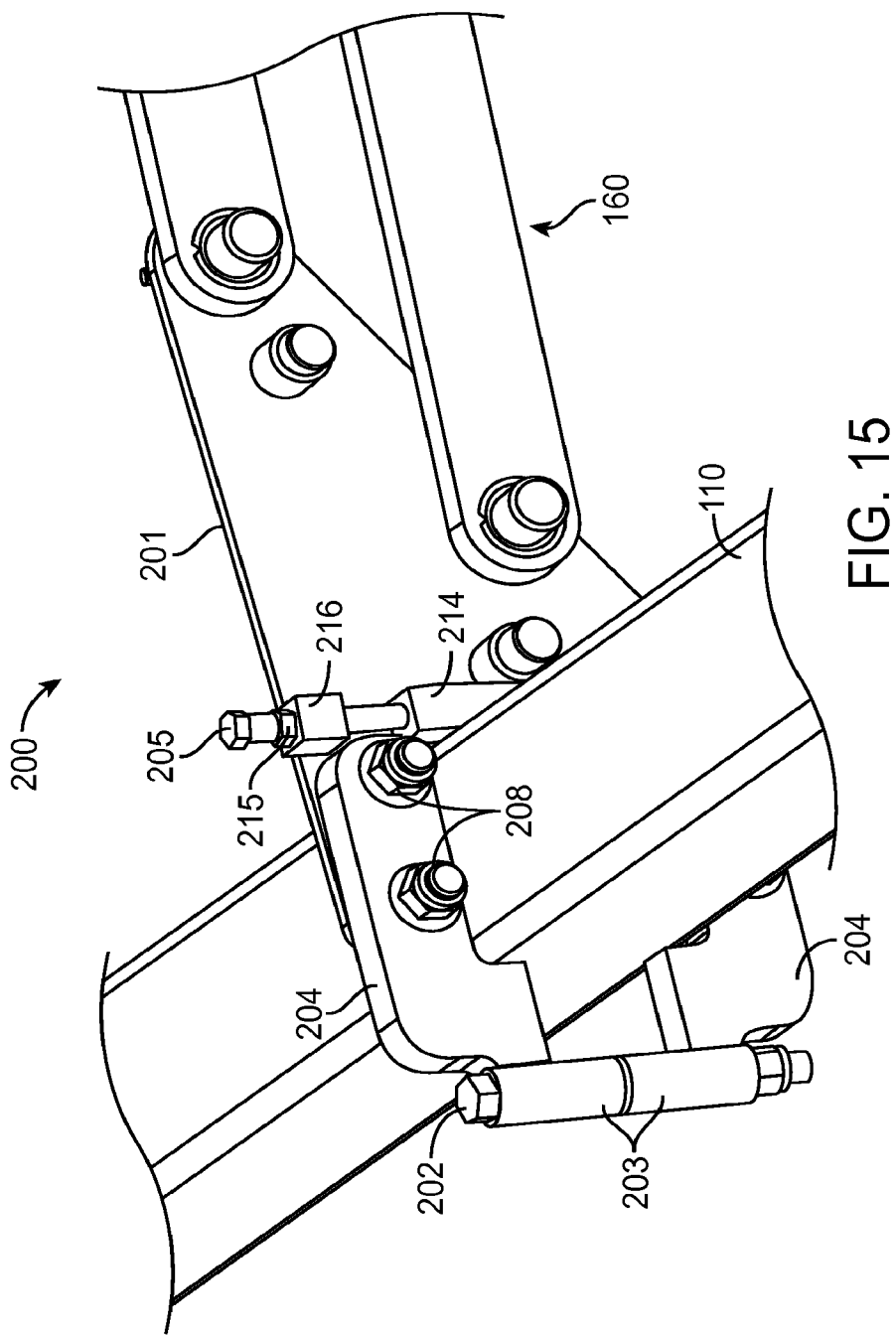
FIG. 15 shows a removable mounting mechanism of FIG. 14, with one of a planar brackets removed for clarity, according to one embodiment.
Figure 16:
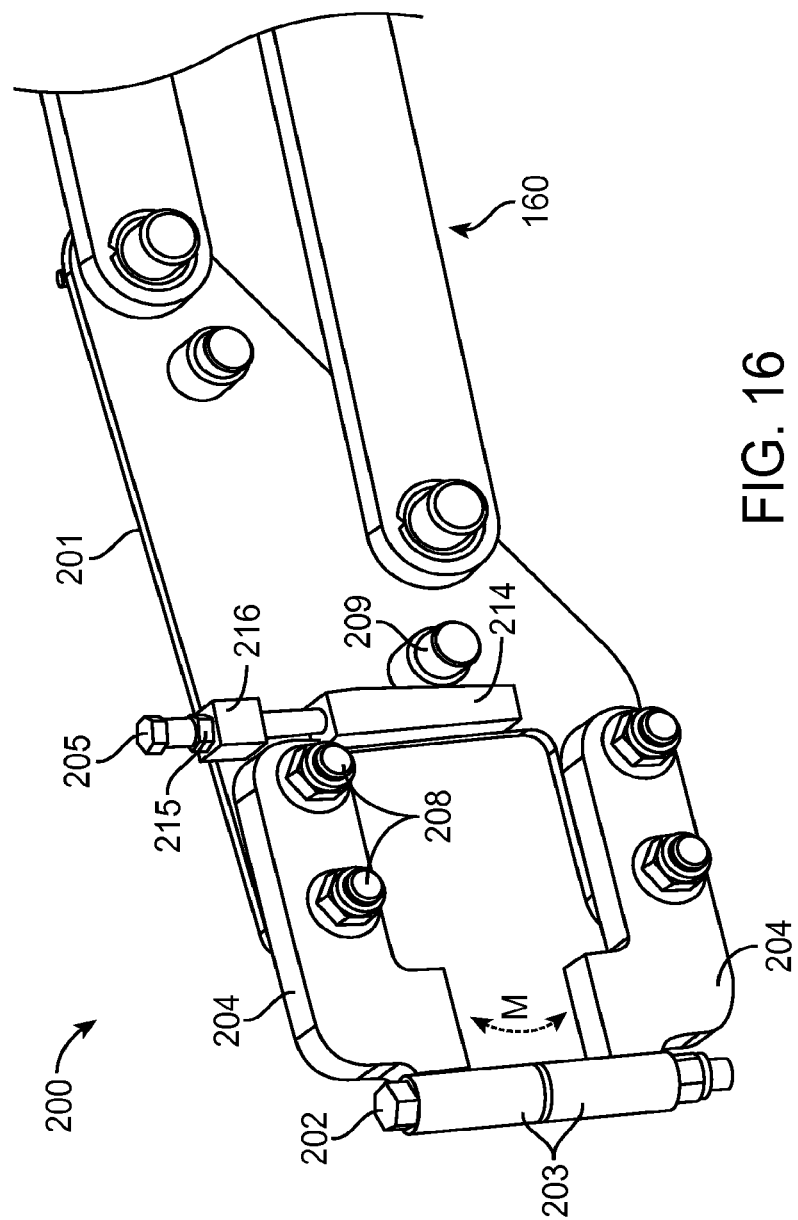
FIG. 16 shows the removable mounting mechanisms of FIG. 15, dismounted from the vehicle frame, according to one embodiment.

FIG. 14 shows another perspective view of a removable mounting mechanism 200 as mounted on the frame 110. FIG. 15 shows the removable mounting mechanism 200 of FIG. 14, with one of the planar brackets 201 removed for clarity. FIG. 16 shows the removable mounting mechanism 200 of FIG. 15, without mounting on the frame 110.

Figure 17A:
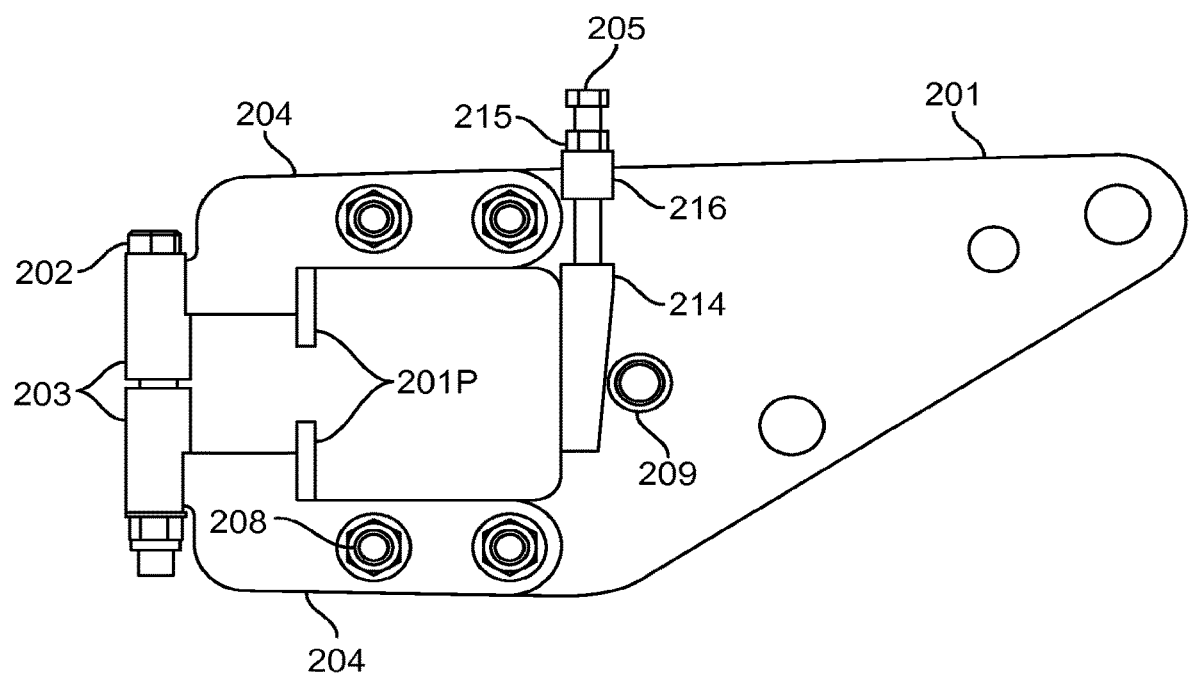
FIG. 17A shows a side view of a mounting mechanism of FIG. 16, illustrating an optional wedge system, according to one embodiment.
Figure 17B:
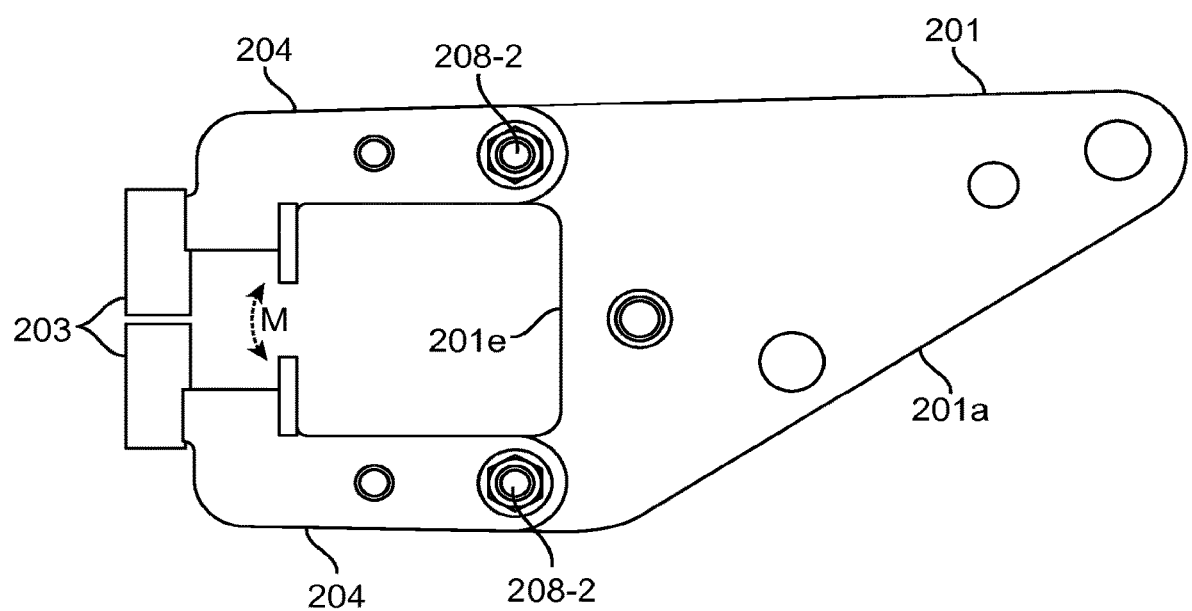
FIG. 17B shows the mounting mechanism of FIG. 17A without the optional wedge, according to one embodiment.
Figures 20A, 20B:
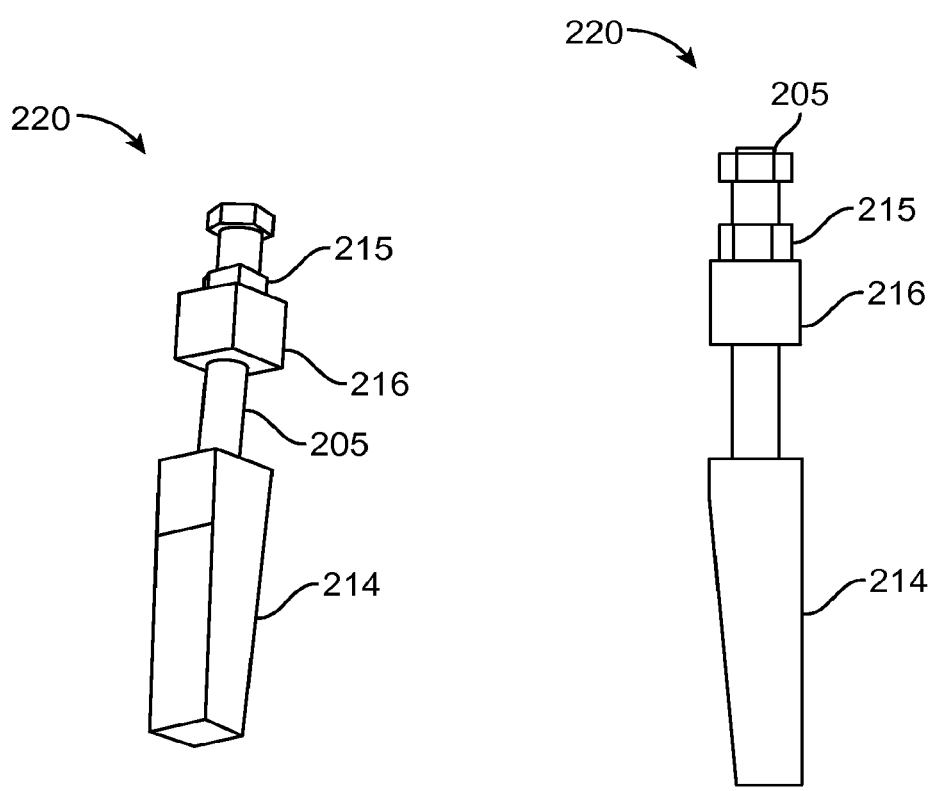
FIG. 20A shows a perspective view of the wedge system of FIG. 17A, according to one embodiment.
FIG. 20B shows a side view of the wedge system of FIG. 20A, according to one embodiment.

FIG. 17A shows a side view of a mounting mechanism 200 of FIG. 16 with one of the brackets 201 removed, to illustrate an optional adjustable clearance reduction system 220 (FIGS. 20A-B). In one embodiment, the adjustable clearance reduction system comprises a wedge system 220 including a screw 205, jam nut 215, wedge member 214 and holder 216. FIG. 17B shows the mounting mechanism of FIG. 17A without the screw 202 and the wedge system 220.

In FIGS. 15, 16, 17A and 17B, one of the brackets 201 is not shown to provide a clear view of the elements between the brackets 201. Further, in FIGS. 15 and 16, the plates 201P are not shown, and in one embodiment the plates 201P may be optional.

Figure 18:
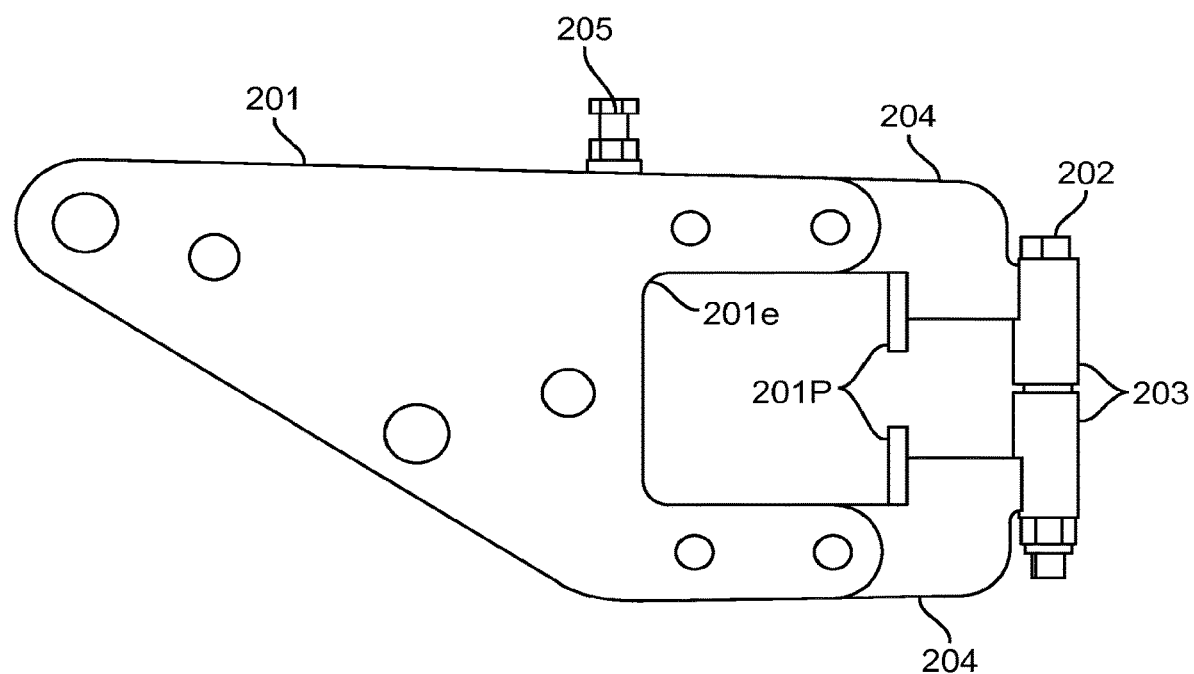
FIG. 18 shows a side view of a mounting mechanism of FIG. 17A illustrating a mounting bracket and clamping jaw, according to one embodiment.

FIG. 18 shows another side view of the mounting mechanism 200 of FIG. 17A with a bracket 201 and jaw 204 attached to the bracket 201. FIG. 19 shows a side view of the jaw 204 of FIG. 18, with screws 208 removed. FIG. 20A shows a perspective view of the wedge system 220, and FIG. 20B shows a side view of the wedge system 220.

To mount/install the lift gate system on the frame 110 using the mounting mechanisms 200, in each mounting mechanism 200 the screw 202 is removed from the annular extensions 203, and the screws 208-1 (FIG. 10B) are removed such that the jaws 204 can rotate away from each other by pivoting on the remaining screws 208-2 (e.g., along arrow M in FIG. 17B). This allows adjusting the jaw opening to receive the frame 110 therein. The jaws of each mounting mechanism 200 are then placed around the frame 110, the jaws 204 are then rotated back toward each other around at least a portion of the circumference of the frame 101, the screws 208-1 are put back in place through the jaws 204 and brackets 201, the screw 202 is placed through annular extensions 203 (FIG. 14), and all screws are tightened to securely maintain the mounting mechanism 200 on the frame 110.

In one embodiment, each optional wedge system 220 may be utilized to further secure the mounting mechanisms 200 to the frame 110. In one embodiment, each wedge system 220 comprises a rectangular holder 216 attached (e.g., welded) between the brackets 201. Mounting brackets 201 of the corresponding mounting mechanism 200 are placed on the frame 110 and positioned with the positioner pin 209 (FIG. 10B) against the brackets 201 on the frame 110 (e.g., the positioner pin 209 is welded with the brackets 201).

As shown in at least FIGS. 13, 14 and 15, in assembling the mounting mechanism 200 for mounting on the frame 110, the bolts/screws 202 are tightened until the jaws 204 are urged to the surfaces (e.g., top, bottom and a side surface) of the frame 110. In adjusting the wedge system 220, a threaded screw 205 of the wedge system 220 is disposed in a threaded opening of the holder 216 (FIG. 15), and tightened therein and driven into the wedge element 214, until the wedge element 214 is jammed in between the screw 205, the frame tube 110 and the positioner pin 209 (FIG. 13). The jamming effect helps reduce clearance between the frame 110 and the brackets 201 (and jaws 204) of the mounting mechanism 200 relative to the frame 110. The screw 205 may be turned to jam with the nut 215, to reduce the clearance in the mounting mechanism 200. Further, the screws 202 are tightened, and the screws 208 are tightened. The wedge element 214 is pushed down by the screw 205. The threaded holder 216 is welded with the brackets 201, such that when the screw 205 is turned in the clockwise direction, for right handed thread, the screw 205 moves down and pushes the wedge element 214 down to reduce clearance as described.

The mounting mechanisms 200 are removable, thereby allows simplified mounting and dismounting of underride systems to the frame 110, independent of the lift gate components. As such, the mounting mechanisms 200 allow the underride system to be removed while the lift gate remains attached to the vehicle. Further, the mounting mechanisms 200 allow an underride system to be attached to a vehicle even without a lift gate present. Further, the mounting mechanisms 200 allow simplified and economical replacement of a first underride system with a second underride system whether or not a lift gate is attached to the vehicle.

Further, the mounting system can be used to removably attach an underride system that is not movable (not rotatable), to a vehicle.

Further, in one embodiment, one of the jaws 204 can be fixed relative to the brackets 201 and the other one of the jaws 204 can be removable and rotatable to allow adjusting the jaw opening for receiving at least a portion of the frame 110.

The dimensions of the brackets 201 may be selected based on factors such as expected loading conditions of the frame 110 by the lift gate, strength/thickness of the materials used.

In one embodiment, each mounting system comprises only one bracket 201 to which the jaws 204 are attached via screws.

The dock lock system and the removable mounting mechanisms can be made from a rigid material such as a metal.

Figure 22A:
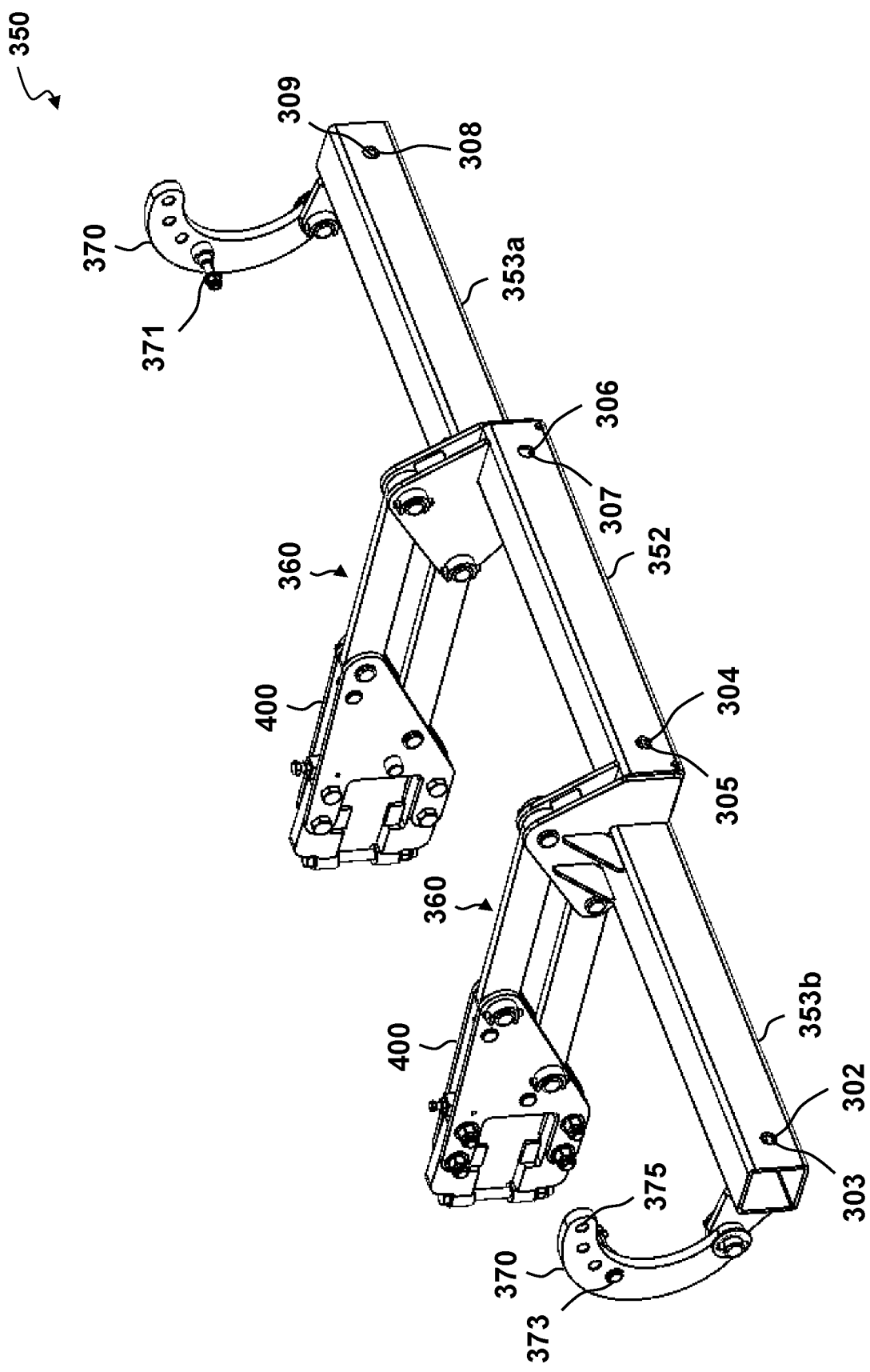
FIG. 22A shows a perspective view of an underride having apertures for proximity sensors and using removable mounting mechanisms for coupling/mounting the underride to the vehicle, according to an embodiment.
Figure 22B:
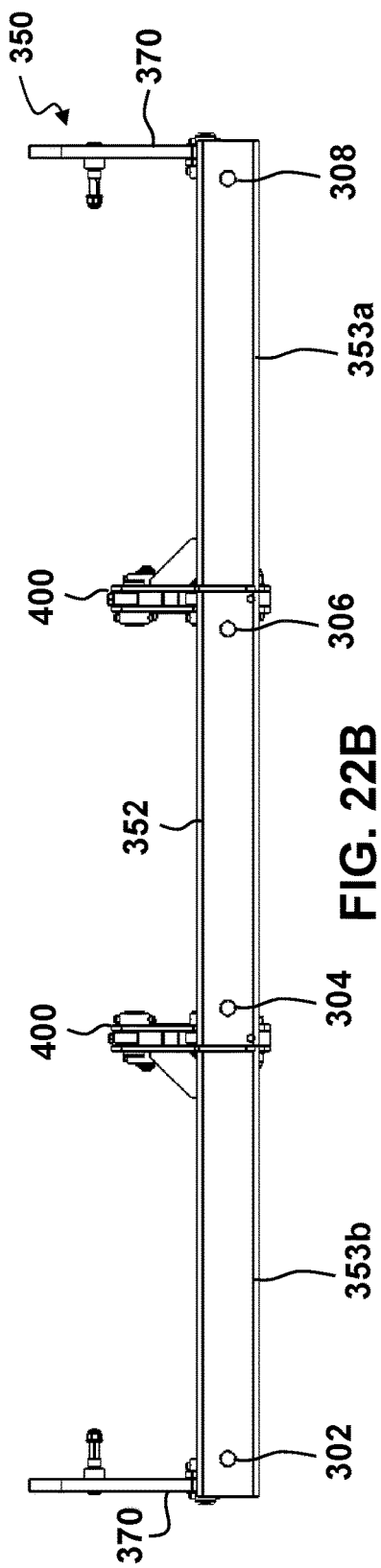
FIG. 22B shows a front view of the underride of FIG. 22A having apertures for proximity sensors and using removable mounting mechanisms for coupling/mounting the underride to the vehicle, according to an embodiment.
Figure 22C:
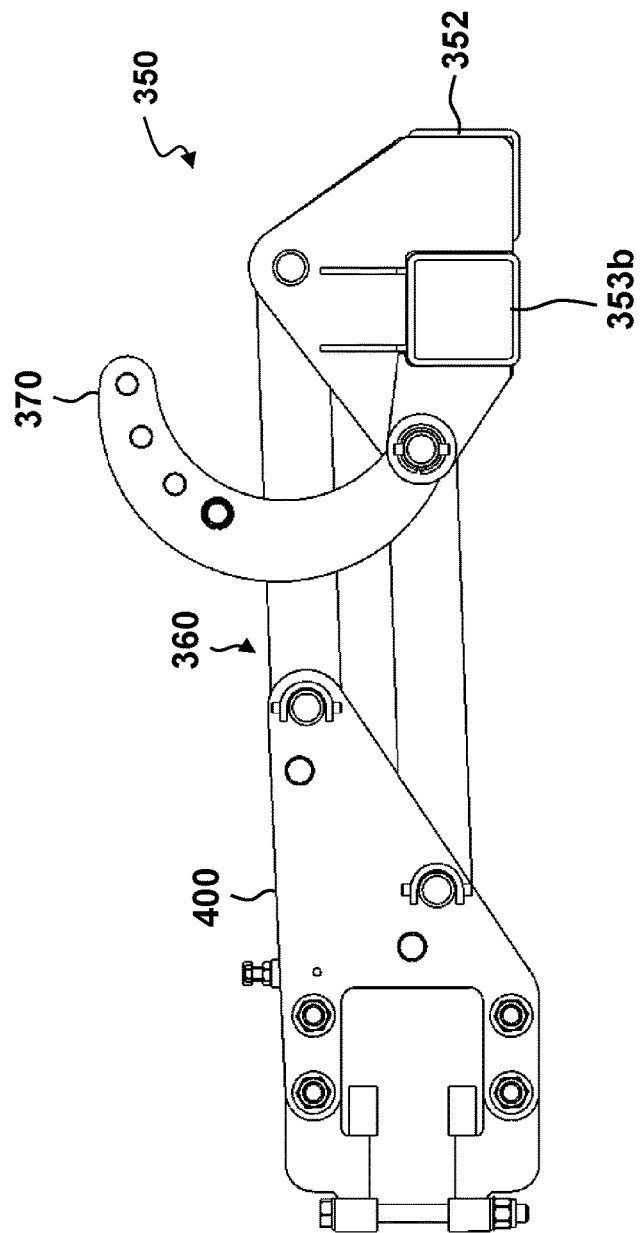
FIG. 22C shows a side view of the underride of FIG. 22A having apertures for proximity sensors and using removable mounting mechanisms for coupling/mounting the underride to the vehicle, according to an embodiment.

FIG. 22A shows a perspective view of an underride 350 having apertures 302, 304, 306, 308 for proximity sensors 303, 305, 307, 309 and using removable mounting mechanisms for coupling/mounting the underride to the vehicle, according to an embodiment. FIG. 22B shows a front view of the underride of FIG. 22A having apertures 302, 304, 306, 308 for proximity sensors 303, 305, 307, 309 and using removable mounting mechanisms for coupling/mounting the underride to the vehicle, according to an embodiment. FIG. 22C shows a side view of the underride of FIG. 22A having apertures 302, 304, 306, 308 for proximity sensors 303, 305, 307, 309 and using removable mounting mechanisms for coupling/mounting the underride to the vehicle, according to an embodiment. The underride 350 may include two linkage brackets 370. Each linkage bracket 370 may be a substantially straight bracket, an arcuate bracket, or any shape to accommodate the desired movement and positioning of the underride 350 relative to the vehicle. Each linkage bracket may include one or more holes 373, 375, e.g., four holes (HOLE #1, . . . , HOLE #4) along the length of the linkage bracket 370. In each position of the underride, e.g., HOLE #1, . . . , HOLE #4, the front face of the underride 350 remains substantially parallel to a vertical plane, allowing proper operation and maximum possible efficiency of the proximity sensors 303, 305, 307, 309. Thus, no up or down tilting of the proximity sensors 303, 305, 307, 309 is needed.

The underride 350 may include a generally elongate member, which includes a middle portion 352 and side portions 353 a, 353 b. The middle portion 352 may form a central extrusion portion that is offset relative to the first and second portions 353 a, 353 b. The underride 350 can be positioned relative to a lift gate system such that when the underride 350 is fully extended, the middle portion 352 may be substantially flush with a rear plane of the bed or extension plate of the vehicle.

The underride 350 may include one or more apertures 302, 304, 306, 308 disposed in the generally elongate member. The side portions 353 a, 353 b, may each include one or more apertures 302, 308. The middle portion 352 may include two or more apertures 304, 306. Proximity sensors 303, 305, 307, 309, or backup sensors, may be disposed inside the underride 350 and aligned with the one or more apertures 302, 304, 306, 308. Each proximity sensors 303, 305, 307, 309 may fit inside of each respective aperture 302, 304, 306, 308 in the underride 350. Proximity sensors 303, 305, 307, 309 may have various diameters, and so different size apertures may be needed to allow tight fit of the sensor that will hold it in place. In one embodiment, rectangular brackets with rivets may be attached on top of the apertures 302, 304, 306, 308 with hole size corresponding to the diameter of the proximity sensors 303, 305, 307, 309. One or more bracket kits may be used, with the brackets having hole sizes according to their sensor sizes.

Each mounting mechanism 400 may include a pair of generally planar brackets connected in parallel via screws, and spaced by a pair of moveable clamping jaws sandwiched therebetween. In one embodiment, each jaw may include an L-shaped jaw element. The removable mounting mechanisms 400 may be mounted to a frame of a vehicle. The mounting mechanisms 400 support the linkage 360 which in turn supports the underride 350.

Figure 23A:
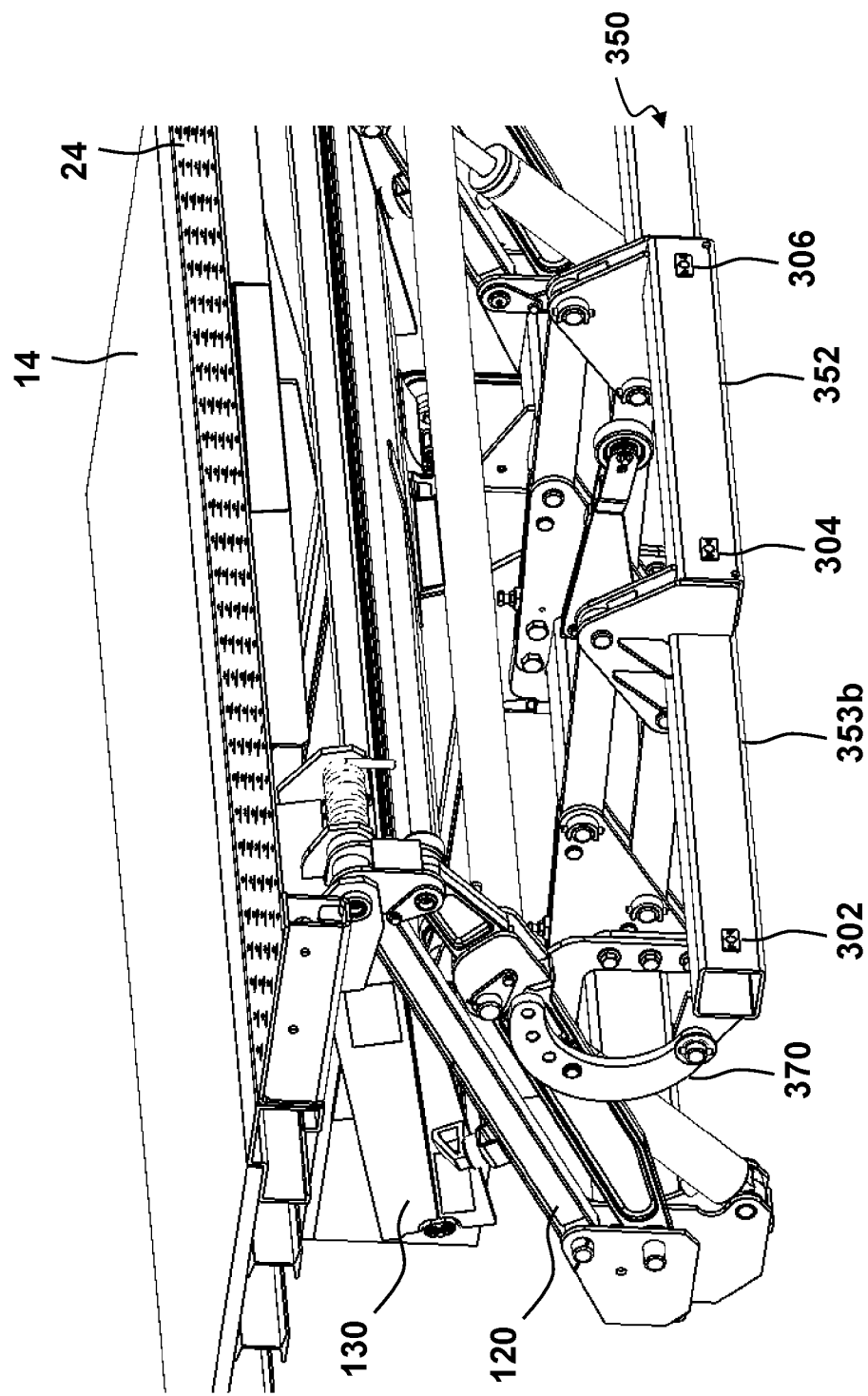
FIG. 23A shows a perspective view of the lift gate system with folded platform and the lift gate stowed under the vehicle bed, where a lift gate bracket for the underride linkage is set at a first hole to allow different ground clearance levels for the lift gate components, according to an embodiment.
Figure 23B:
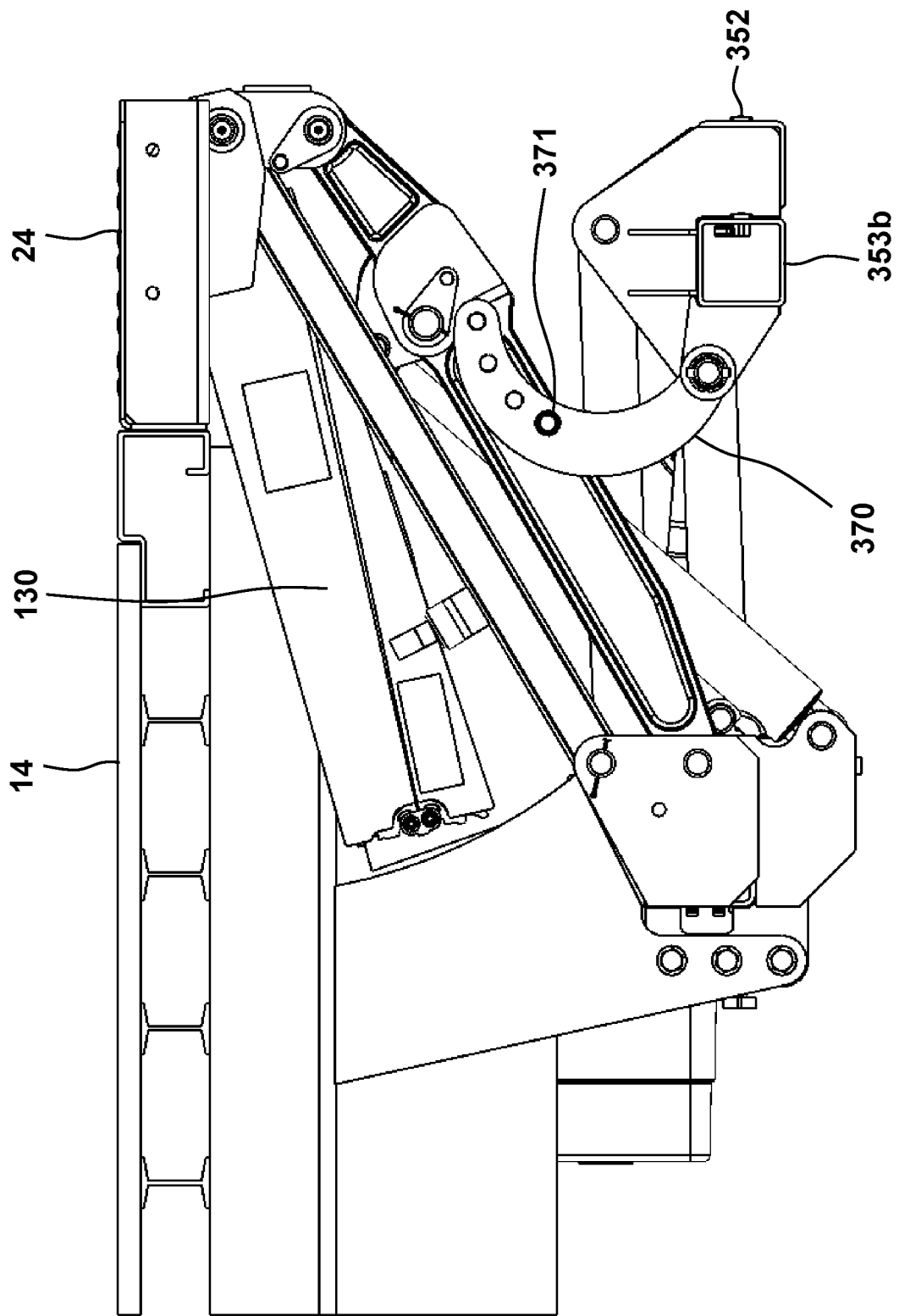
FIG. 23B shows a side view of the lift gate system of FIG. 23A with folded platform and the lift gate stowed under the vehicle bed, where the lift gate bracket for the underride linkage is set at the first hole to allow different ground clearance levels for the lift gate components, according to an embodiment.

FIG. 23A shows a perspective view of the lift gate system with folded platform 130 and the lift gate stowed under the vehicle bed 14, where a lift gate bracket for the underride linkage is set at a first hole to allow different ground clearance levels for the lift gate components, according to an embodiment. FIG. 23B shows a side view of the lift gate system of FIG. 23A with folded platform and the lift gate stowed under the vehicle bed 14, where the lift gate bracket for the underride linkage is set at the first hole to allow different ground clearance levels for the lift gate components, according to an embodiment.

Attaching the linkage bracket 370 to the linkage 120 via one of the one or more holes provides a variable ground clearance for the underride 350. There can be a different number of holes for different ground clearance options, based on the bed height of the vehicle (e.g., truck or trailer). Each linkage bracket 370 is adjustable such that the distance of the underride 350 to the ground can be changed or maintained for different vehicle bed heights.

Each linkage bracket 370 has two ends with spaced holes therebetween along the length of the linkage bracket 370. Each arcuate bracket 370 has one or more openings/holes, through which a pin 371 may inserted, thus rotatably coupling the linkage bracket 370 with the linkage mechanism 120 By selecting among the holes at various positions, the position of the underride 350 relative to the vehicle bed 14 can be adjusted.

The lift gate system is attached to the vehicle having a vehicle bed 14. An extension plate 24 may be coupled to, and substantially level with, the vehicle bed 14. The lift platform 130 is in its stowed (tucked) position under the vehicle bed 14. The underride 350 and/or linkage mechanisms may be coupled to the platform linkage mechanisms 120 with the linkage bracket 370. The coupling to linkage bracket 370 is adjustable so that the distance of the underride 350 relative to the ground can be changed to accommodate different vehicle bed heights. The underride 350 itself and/or the underride linkage mechanisms may be also be coupled to the platform linkage mechanisms 120 such that when the platform linkage mechanisms 120 raise or lower the platform 130 through the action of one or more actuators 122, the underride 350 is also raised or lowered by revolving around the frame via the linkage mechanisms. As such, the underride 350 essentially co-revolves with the platform 130.

Figure 24A:
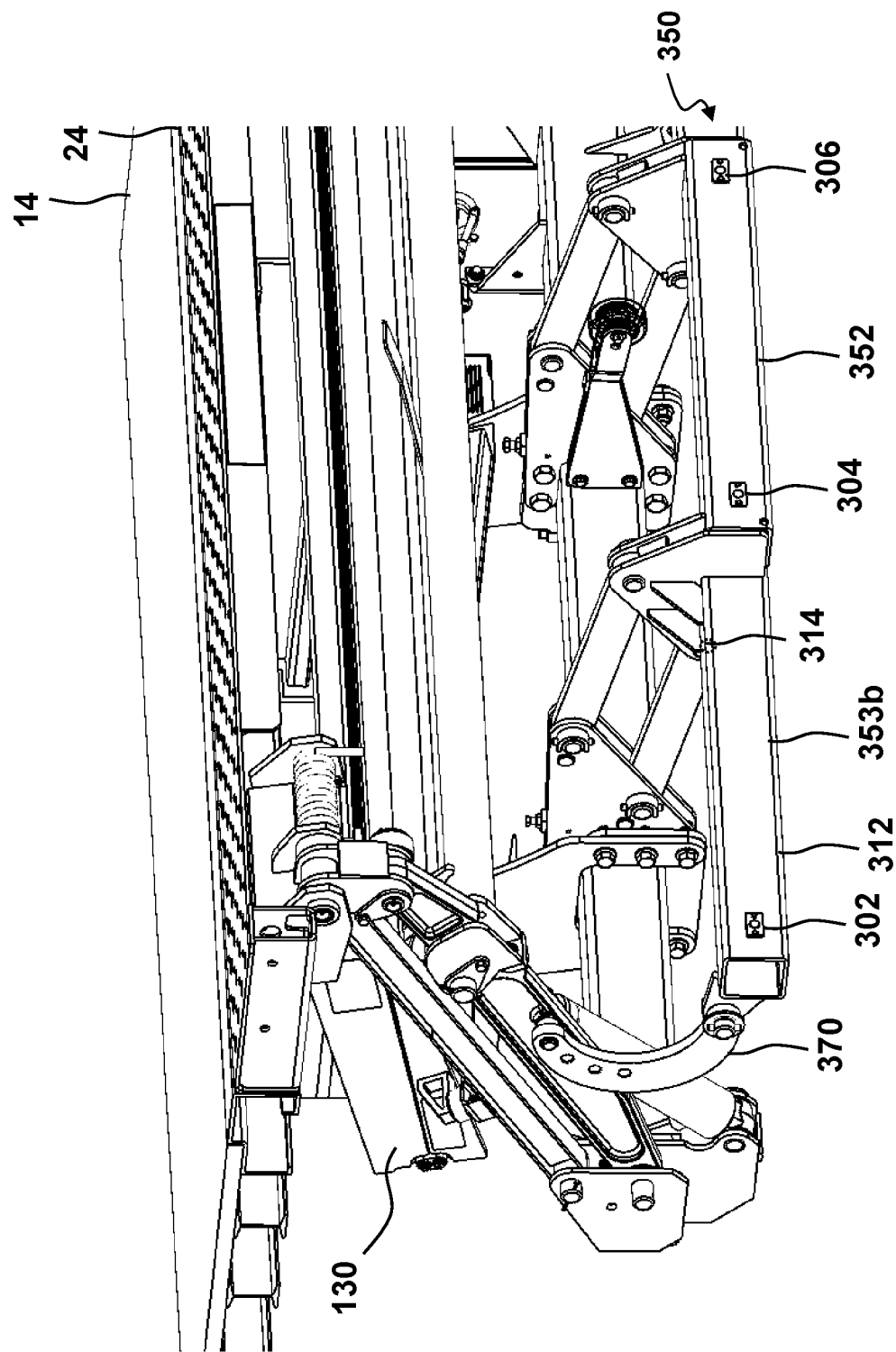
FIG. 24A shows a perspective view of the lift gate system with folded platform and the lift gate stowed under the vehicle bed, where a lift gate bracket for the underride linkage is set at a fourth hole to allow different ground clearance levels for the lift gate components, according to an embodiment.
Figure 24B:
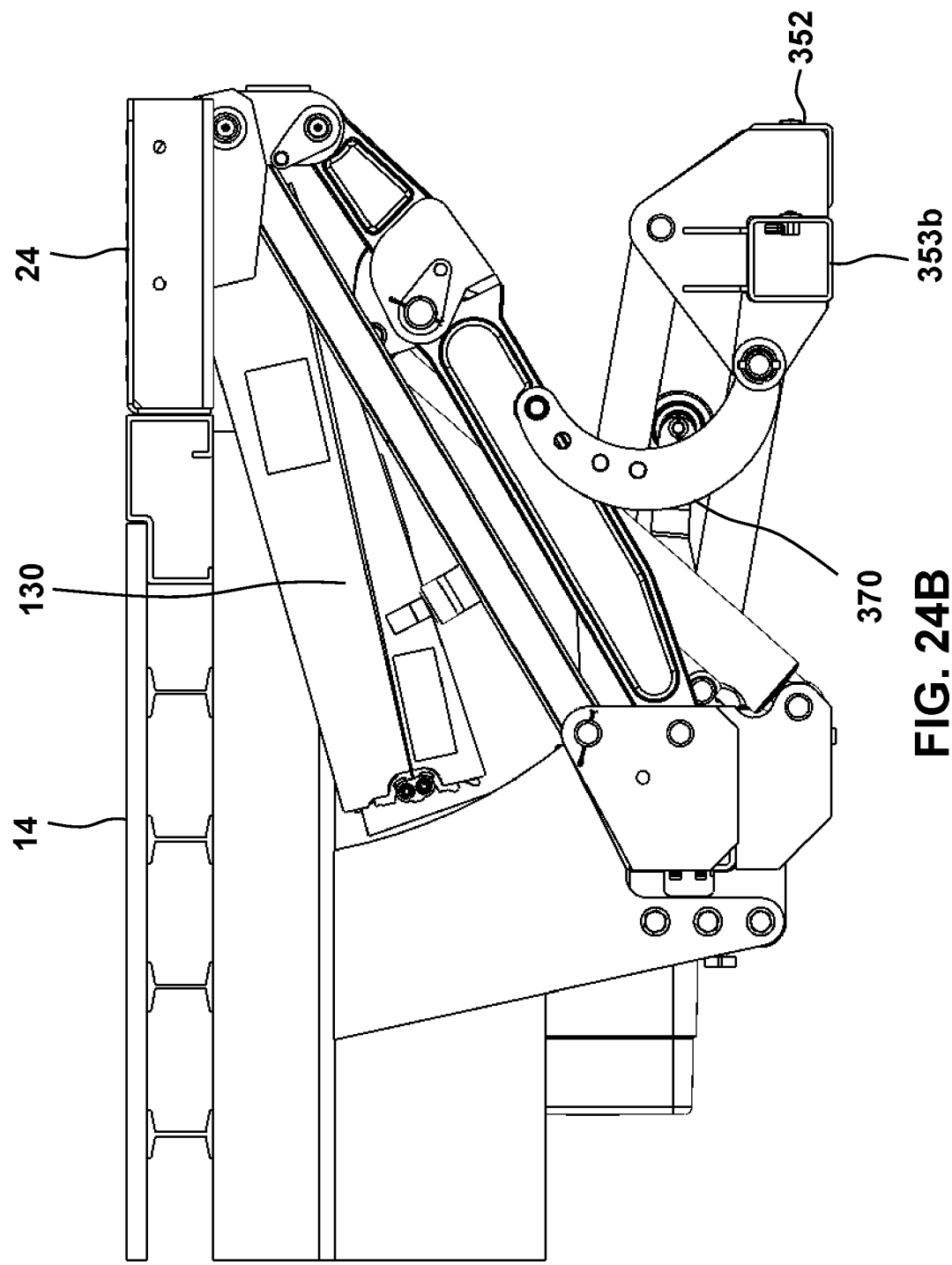
FIG. 24B shows a side view of the lift gate system of FIG. 24A with folded platform and the lift gate stowed under the vehicle bed, where the lift gate bracket for the underride linkage is set at the fourth hole to allow different ground clearance levels for the lift gate components, according to an embodiment.

FIG. 24A shows a perspective view of the lift gate system with folded platform 130 and the lift gate stowed under the vehicle bed 14, where a lift gate bracket for the underride linkage is set at a fourth hole to allow different ground clearance levels for the lift gate components, according to an embodiment. FIG. 24B shows a side view of the lift gate system of FIG. 24A with folded platform 130 and the lift gate stowed under the vehicle bed 14, where the lift gate bracket for the underride linkage is set at the fourth hole to allow different ground clearance levels for the lift gate components, according to an embodiment. The linkage bracket 370 may be attached at one of two or more holes to vary the height of the underride 350 relative to the ground. In some embodiments, additional apertures may be placed at any position of the underride 350 to allow for mounting of any type of sensors. In one embodiment, an aperture 312 may be disposed on a bottom of the underride 350 facing the ground. In another embodiment, an aperture 314 may be placed on a top of the underride 350 facing the underside of the structure or vehicle.

Figure 25A:
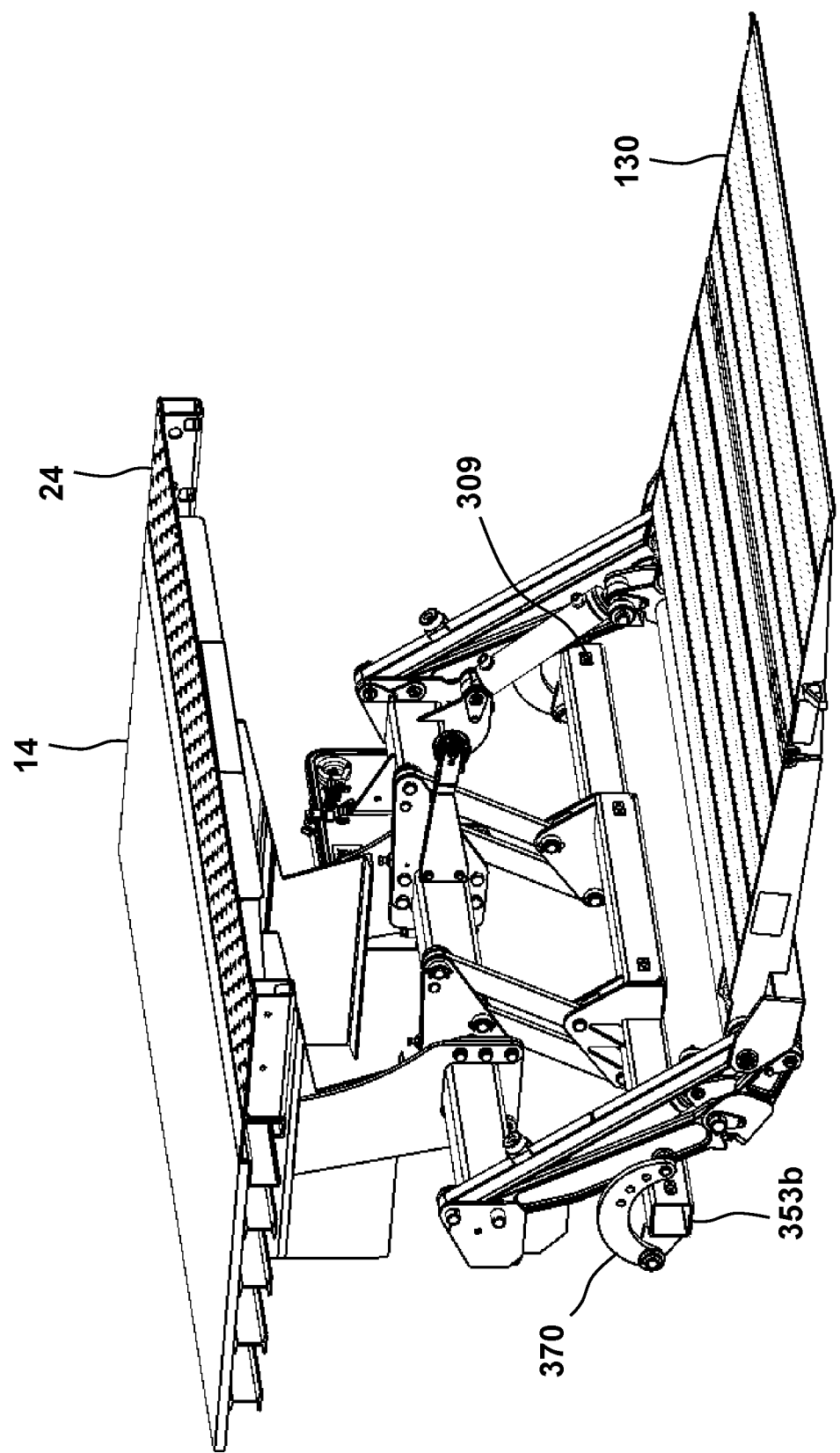
FIG. 25A shows a perspective view of the lift gate system with the lift platform lowered, according to an embodiment.

FIG. 25A shows a perspective view of the lift gate system with the lift platform 130 lowered, according to an embodiment. FIG. 25B shows a side view of the lift gate system of FIG. 25A with the lift platform 130 lowered, according to an embodiment. The proximity sensors 309 may detect an object once it is loaded onto the lift platform 130. For example, in some embodiments, the proximity sensor 309 may be used to determine when an object is on the lift platform 130 and near the proximity sensor 309. In another embodiment, the proximity sensor 309 may be used to determine when an object has been removed from the lift platform 130 and/or from a sensing range of the proximity sensor 309. In another embodiment, the proximity sensor 309 may be used to determine if an object is on a portion of the lift platform 130 near the proximity sensor 309. In this way, the proximity sensor 309 may be used to detect obstacles when the lift gate is stowed as well as when the lift gate is in use.

Figure 26A:
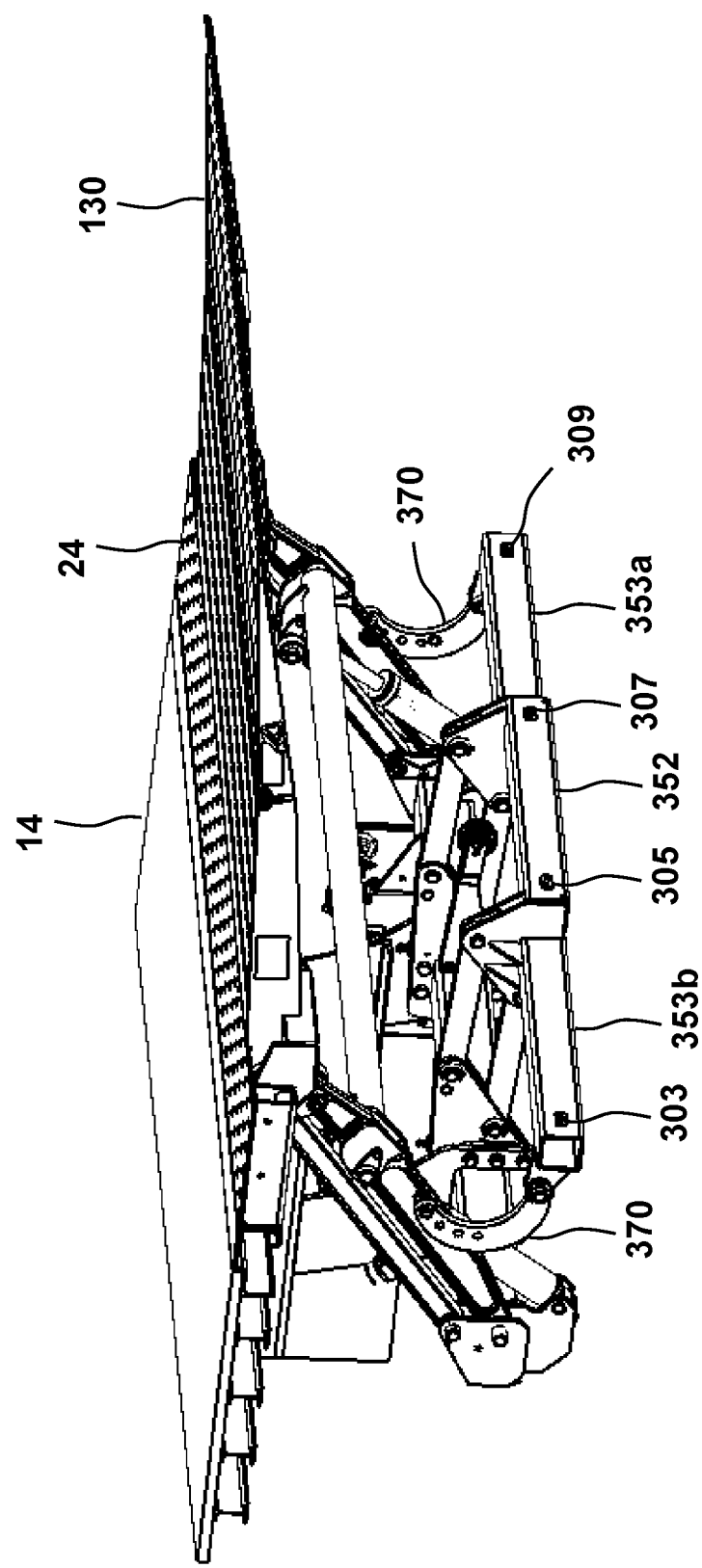
FIG. 26A shows a perspective view of the lift gate system with the lift platform raised, according to an embodiment.
Figure 26B:
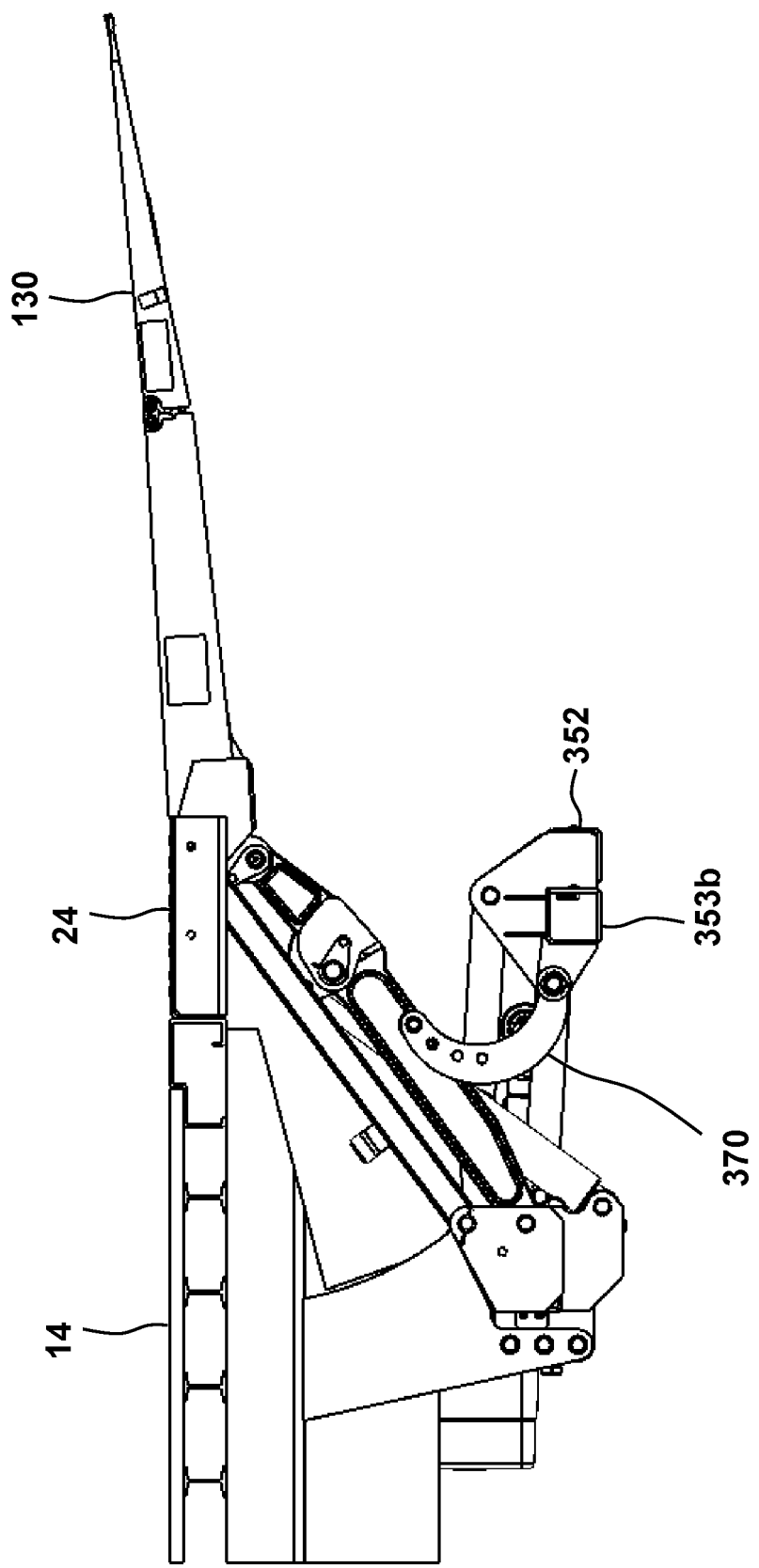
FIG. 26B shows a side view of the lift gate system of FIG. 25A with the lift platform raised, according to an embodiment.

FIG. 26A shows a perspective view of the lift gate system with the lift platform 130 raised, according to an embodiment. FIG. 26B shows a side view of the lift gate system of FIG. 25A with the lift platform 130 raised, according to an embodiment. The proximity sensors 303, 305, 307, 309 may be used to detect an object under the lift platform 130 and within sensing range of the proximity sensors 303, 305, 307, 309 when the lift platform is raised. If an object is detected by the proximity sensors 303, 305, 307, 309, i.e., an obstacle is under the lift platform 130 and within sending range of the proximity sensors 303, 305, 307, 309 then an indication may be provided. The proximity sensors 303, 305, 307, 309 may be used to detect objects both when the vehicle is in motion and when the vehicle is stopped and the lift platform 130 is in use.

Figure 27:
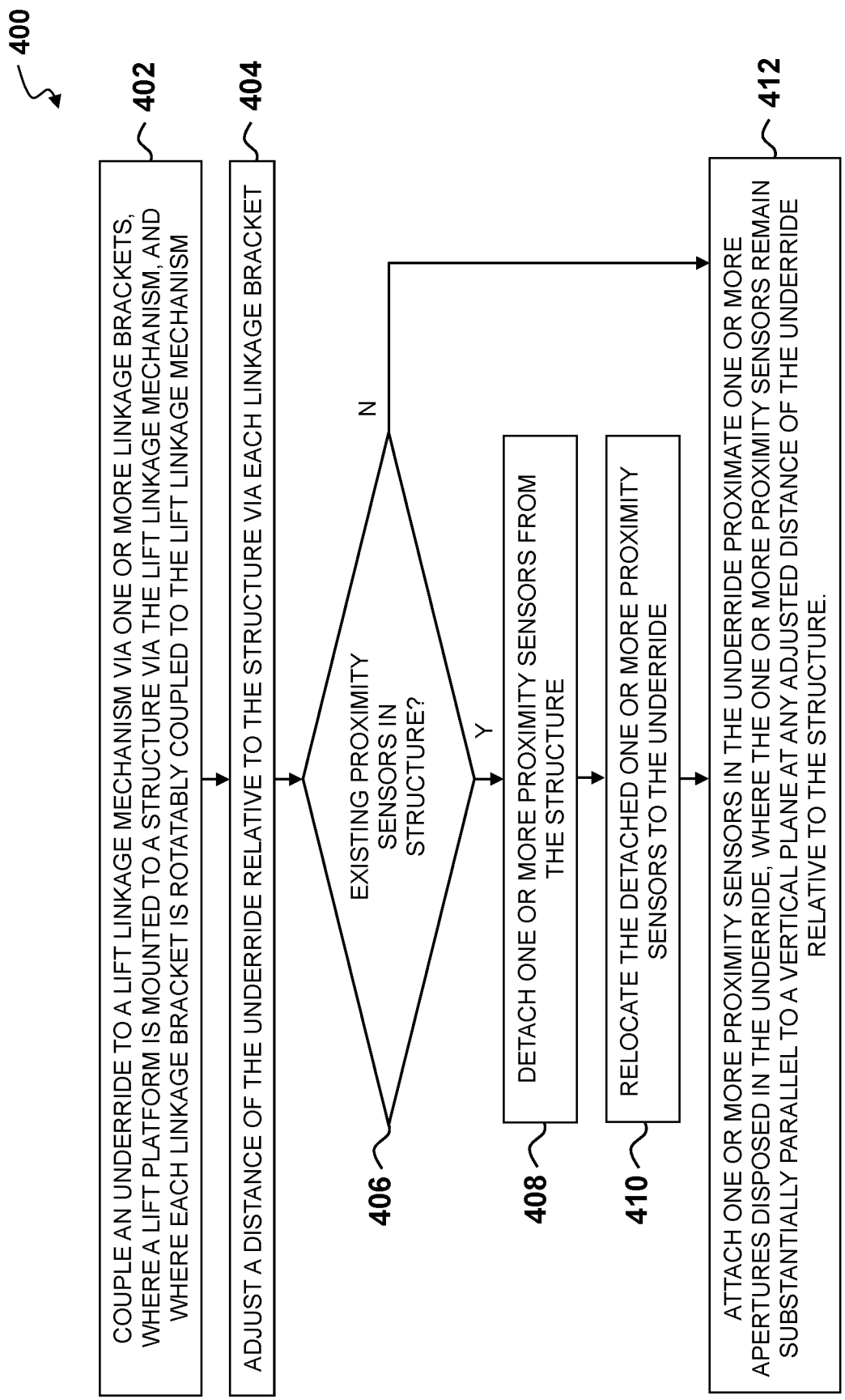
FIG. 27 depicts a high-level flowchart of a method embodiment of attaching an underride with one or more proximity sensors, according to one embodiment.
Figure 28D:
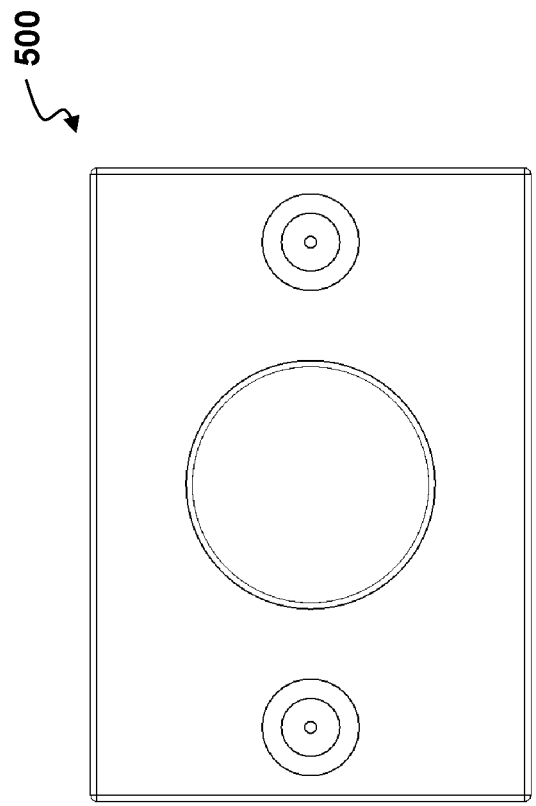
Figure 28E:
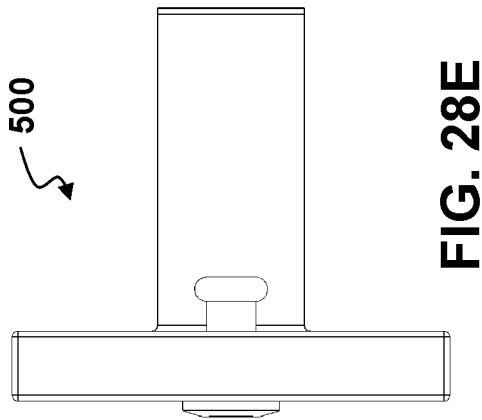
Figure 28C:
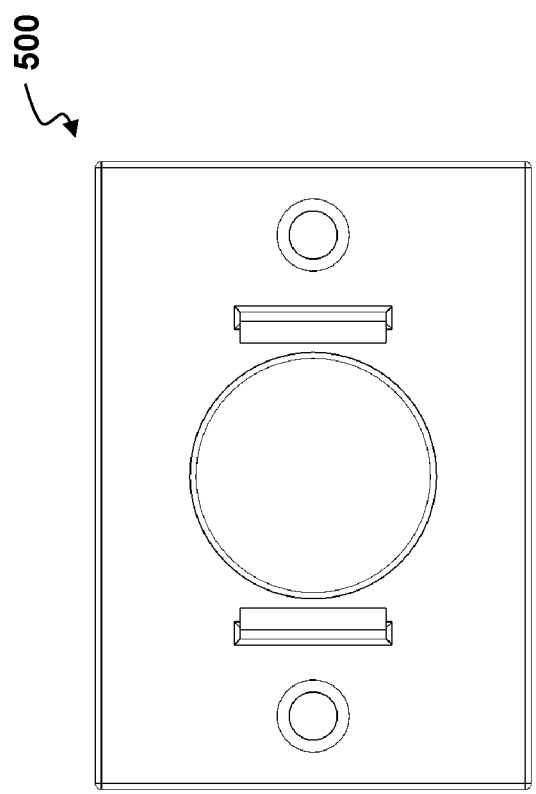

FIG. 27 depicts a high-level flowchart of a method 400 embodiment of attaching an underride with one or more proximity sensors, according to one embodiment. The method 400 may include coupling an underride to a lift linkage mechanism via one or more linkage brackets (step 402). In some embodiments, the lift platform may be mounted to a structure, such as a vehicle, via the lift linkage mechanism. In additional embodiments, each linkage bracket may be rotatably coupled to the lift linkage mechanism. The method 400 may also include adjusting a distance of the underride relative to the structure via each linkage bracket (step 404). In some embodiments, each linkage bracket may have one or more apertures to attach to the lift linkage mechanism such that the underride may be positioned at various heights from the structure and/or the ground.

An installer or user may determine whether there are any existing proximity sensors in the structure (406). In some embodiments, existing proximity sensors in a structure or vehicle may be reused. In other embodiments, new proximity sensors may need to be added. If existing proximity sensors exist, the one or more proximity sensors may be detached from the structure (step 408) and then relocated to the underride (step 410). For example, a vehicle may have existing proximity sensors that would be blocked by the liftgate and/or underride. These existing proximity sensors may then be installed in the underride without the need for new or additional proximity sensors. In some embodiments, a mix of new and existing sensors may be used.

The method 400 may then include attaching one or more proximity sensors in the underride proximate one or more apertures disposed in the underride (step 412). The one or more proximity sensors may remain substantially parallel to a vertical plane at any adjusted distance of the underride relative to the structure. Even if the underride is raised or lowered relative to the structure, via the linkage bracket, the proximity sensors do not need to be readjusted as they remain substantially parallel to the vertical plane regardless of the height of the underride. Adjusting the height of the underride does not require a readjustment of the proximity sensors.

FIGS. 28A-28E depict front perspective, rear perspective, rear, front, and side views, respectively, of a sensor bracket 500 with rivets, according to an embodiment. The sensor bracket 500 may include one or more rivets 502, 504 or other fasteners to attach the sensor bracket 500 to the underride, as shown in FIG. 26A. The sensor bracket 500 may also include an aperture 506 sized to receive a sensor, such as a proximity sensor. The sensor bracket may also include one or more attachment legs 506, 508. Each attachment leg 506, 508 may have a respective connector end 510, 512. The connector ends 510, 512 may clip into a sensor body to hold the sensor in place such that the sensor is aligned with the aperture 506. In some embodiments, the sensor may be any sensing device, such as a proximity sensor, a back-up sensor, a camera, and the like. The angle of each sensor in each sensor bracket 500 may face in any direction relative to a vertical plane or ground. In some embodiments, the angle of sensors in the sensor bracket 500 may be changed.

Figure 29A:
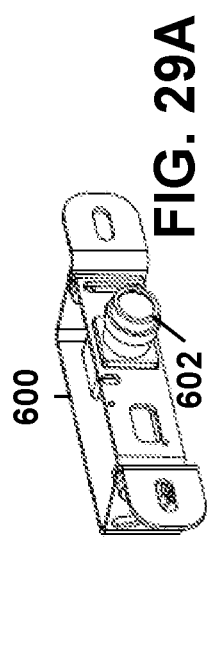
FIG. 29A depicts a perspective view of a sensor and sensor bracket in a first position, according to an embodiment.
Figure 29C:
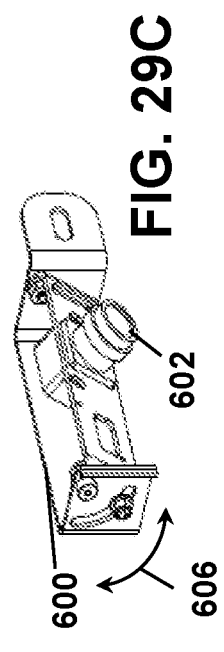
FIG. 29C depicts the sensor and sensor bracket of FIG. 29B in a second position, according to an embodiment.
Figure 29B:
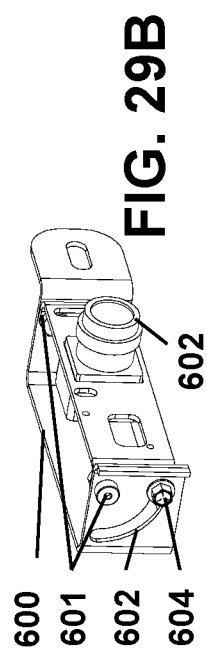
FIG. 29B depicts a partial cut-away view of the sensor and sensor bracket of FIG. 29A in the first position, according to an embodiment.

FIG. 29A depicts a perspective view of a sensor 602 and sensor bracket 600 in a first position, according to an embodiment. FIG. 29B depicts a partial cut-away view of the sensor 602 and sensor bracket 600 of FIG. 29A in the first position, according to an embodiment. FIG. 29C depicts the sensor 602 and sensor bracket 600 of FIG. 29B in a second position, according to an embodiment. FIGS. 29A-29C depict an enlarged view of the sensor bracket 600 as it could be in installed in the underride (not shown), according to an embodiment. The sensor bracket 600 may include at least one pivot connector 601, a curved aperture 602, and an attachment 604. The attachment 604 may be disposed in the curved aperture and may be, for example, a nut and bolt. The sensor 602 pivots 606 about the at least one pivot connector 601 relative to the sensor bracket 600.

A pivot angle of the sensor 602 may be secured via the attachment 604 in the curved aperture 602, according to one embodiment. The sensor angle may be adjusted based on the height of the liftgate, the desired rearview visibility, etc. In some embodiments, the sensor bracket 600 may include at least one pivot connector 601. The sensor 602 may pivot about the at least one pivot connector 601 relative to the sensor bracket 600. A pivot angle of the sensor 602 may be secured via a tightening of the pivot connector 601. The angle of the sensor 602 may be any direction relative to a vertical plane, the structure, and/or ground. In some embodiments, the angle of the sensor 602 in the sensor bracket 600 can be changed. The sensor 602 may be any sensor, such as a camera, a backup camera, a proximity sensor, a back-up sensor, and the like.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:
   a lift platform for mounting to a structure via a lift linkage mechanism;
   an underride coupled to the lift linkage mechanism via one or more linkage brackets, wherein each linkage bracket is rotatably coupled to the lift linkage mechanism, and wherein a distance of the underride relative to the structure is adjustable via each linkage bracket;
   one or more apertures disposed in the underride; and
   one or more sensors disposed in the underride proximate the one or more apertures;
   wherein the one or more sensors remain substantially parallel to a vertical plane at any adjusted distance of the underride relative to the structure.

2. The system of claim 1, wherein the vertical plane is relative to ground when the underride is mounted to a vehicle.

3. The system of claim 1, wherein at least one sensor of the one or more sensors is at least one of: a proximity sensor and a camera.

4. The system of claim 1, wherein the lift linkage mechanism is a parallelogram linkage mechanism.

5. The system of claim 1, wherein each linkage bracket is at least one of: a substantially straight bracket and an arcuate bracket.

6. The system of claim 1, wherein each linkage bracket comprises one or more holes disposed along a length of the linkage bracket.

7. The system of claim 6, further comprising:
one or more pins, wherein each linkage bracket is rotatably coupled to the lift linkage mechanism via a respective pin of the one or more pins inserted through a hole of the one or more holes disposed along the length of the linkage bracket, and wherein a distance of the underride relative to the structure is adjustable based on the hole the respective pin is inserted through.

8. The system of claim 1, wherein the one or more sensors remain substantially parallel to the vertical plane during movement of at least one of: the lift platform and the underride.

9. The system of claim 1, wherein the underride comprises:
a middle portion;
a first side portion; and
a second side portion;
wherein the middle portion forms a central extrusion portion that is offset relative to the first side portion and the second side portion, and wherein the middle portion is substantially flush with a rear plane of the structure when the underride is fully extended.

10. The system of claim 1, wherein the one or more sensors disposed in the underride are relocated from the structure.

11. The system of claim 1, further comprising:
one or more sensor brackets, wherein each sensor bracket of the one or more sensor brackets secures a respective sensor of the one or more sensors disposed in the underride.

12. The system of claim 11, wherein the sensor bracket comprises:
an aperture for receiving the sensor.

13. The system of claim 11, wherein the sensor bracket comprises:
one or more connectors for attaching the sensor bracket to the underride, and wherein the one or more connectors for attaching the sensor bracket to the underride comprise one or more rivets.

14. The system of claim 11, wherein the sensor bracket comprises:
one or more attachment legs; and
one or more connector ends disposed on a respective end of each of the one or more attachment legs;
wherein the one or more connector ends secure a sensor body of the sensor to the sensor bracket.

15. A method comprising:
coupling an underride to a lift linkage mechanism via one or more linkage brackets, wherein a lift platform is mounted to a structure via the lift linkage mechanism, and wherein each linkage bracket is rotatably coupled to the lift linkage mechanism;
adjusting a distance of the underride relative to the structure via each linkage bracket; and
attaching one or more sensors in the underride proximate one or more apertures disposed in the underride;
wherein the one or more sensors remain substantially parallel to a vertical plane at any adjusted distance of the underride relative to the structure.

16. The method of claim 15, further comprising, prior to attaching one or more sensors:
detaching the one or more sensors from the structure; and
relocating the detached one or more sensors to the underride.

17. The method of claim 16, wherein attaching the one or more sensors in the underride further comprises:
attaching the one or more sensors to one or more sensor brackets; and
attaching the one or more sensor brackets to the underride proximate the one or more apertures disposed in the underride.

18. The method of claim 15, wherein the one or more sensors remain substantially parallel to the vertical plane during movement of at least one of: the lift platform and the underride, wherein the vertical plane is relative to ground when the underride is mounted to a vehicle.

19. A system, comprising:
a lift platform for mounting to a structure via a lift linkage mechanism;
an underride coupled to the lift linkage mechanism via one or more linkage brackets, wherein each linkage bracket is rotatably coupled to the lift linkage mechanism, wherein each linkage bracket is an arcuate bracket, wherein each linkage bracket comprises one or more holes disposed along a length of the linkage bracket, and wherein a distance of the underride relative to the structure is adjustable via the one or more holes of each linkage bracket;
one or more apertures disposed in the underride; and
one or more sensors disposed in the underride proximate the one or more apertures;
wherein the one or more sensors remain substantially parallel to a vertical plane at any adjusted distance of the underride relative to the structure.

20. The system of claim 19, wherein the vertical plane is relative to ground when the underride is mounted to a vehicle.

* * * * *